United States Patent
Jiang et al.

(10) Patent No.: US 11,480,668 B2
(45) Date of Patent: Oct. 25, 2022

(54) METHODS OF RANGING FOR NEXT GENERATION VEHICLE-TO-EVERYTHING (NGV) SYSTEMS

(71) Applicant: Intel Corporation, Santa Clara, CA (US)

(72) Inventors: Feng Jiang, Santa Clara, CA (US); Qinghua Li, San Ramon, CA (US); Jonathan Segev, Sunnyvale, CA (US); Bahareh Sadeghi, Portland, OR (US); Thomas J. Kenney, Portland, OR (US); Xiaogang Chen, Portland, OR (US); Gadi Shor, Tel Aviv (IL); Po-Kai Huang, San Jose, CA (US); Robert J. Stacey, Portland, OR (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 16/728,317

(22) Filed: Dec. 27, 2019

(65) Prior Publication Data
US 2020/0132829 A1 Apr. 30, 2020

Related U.S. Application Data

(60) Provisional application No. 62/932,235, filed on Nov. 7, 2019, provisional application No. 62/901,146, filed on Sep. 16, 2019, provisional application No. 62/790,112, filed on Jan. 9, 2019.

(51) Int. Cl.
*G01S 13/76* (2006.01)
*H04W 4/40* (2018.01)

(52) U.S. Cl.
CPC ............. *G01S 13/762* (2013.01); *H04W 4/40* (2018.02)

(58) Field of Classification Search
CPC .............................. G01S 13/762; H04W 4/40
See application file for complete search history.

(56) References Cited

U.S. PATENT DOCUMENTS

| | | | |
|---|---|---|---|
| 11,153,418 B2* | 10/2021 | Martinez | H04L 69/24 |
| 2018/0249437 A1* | 8/2018 | Lindskog | G01S 5/0205 |
| 2019/0327740 A1* | 10/2019 | Verma | H04L 5/0044 |
| 2020/0084302 A1* | 3/2020 | Chu | H04W 4/40 |
| 2021/0050962 A1* | 2/2021 | Yu | H04L 5/0001 |
| 2022/0124467 A1* | 4/2022 | Lim | H04L 1/00 |

* cited by examiner

*Primary Examiner* — Vladimir Magloire
*Assistant Examiner* — Nazra Nur Waheed
(74) *Attorney, Agent, or Firm* — Schwegman Lundberg & Woessner, P.A.

(57) ABSTRACT

Embodiments of an access point (AP), station (STA) and method of communication are generally described herein. In a null data packet (NDP) based ranging procedure between a responding STA and an initiating STA that is unassociated with the responding STA, the responding STA may: transmit a broadcast frame that indicates one or more ranging parameters; receive, from the initiating STA, an NDP announcement (NDPA) frame that indicates transmission of a first NDP from the initiating STA; detect the first NDP from the initiating STA; transmit a second NDP for transmission to the initiating STA; and transmit, to the initiating STA, a location measurement report (LMR) that indicates: a reception time of the first NDP at the responding STA, and a transmission time of the second NDP at the responding STA.

10 Claims, 19 Drawing Sheets

1300

2000

| Frequency (MHz) | 5850 | 5855 | 5865 | 5875 | 5885 | 5895 | 5905 | 5915 | 5925 |
|---|---|---|---|---|---|---|---|---|---|
| Channel number | Guard band | 172 | 174 | 176 | 178 | 180 | 182 | 184 |
| | | | 175 | | | 181 | | |
| Channel usage | | SCH | SCH | SCH | CCH | SCH | SCH | SCH |

The DSRC Frequency Allocation in US

FIG. 20

METHODS OF RANGING FOR NEXT GENERATION VEHICLE-TO-EVERYTHING (NGV) SYSTEMS

PRIORITY CLAIM

This application claims priority under 35 USC 119(e) to U.S. Provisional Patent Application Ser. No. 62/790,112, filed Jan. 9, 2019 [reference number AB7885-Z, 1884.981PRV], and to U.S. Provisional Patent Application Ser. No. 62/901,146, filed Sep. 16, 2019 [reference number AC5030-Z, 1884.982PRV], and to U.S. Provisional Patent Application Ser. No. 62/932,235, filed Nov. 7, 2019 [reference number AC6177-Z, 1884.983PRV], all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Next Generation Vehicle-to-Everything (NGV) protocols. Some embodiments relate to methods, computer readable media, and apparatus for ranging for NGV systems.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 20 illustrates example frequency resources in accordance with some embodiments.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
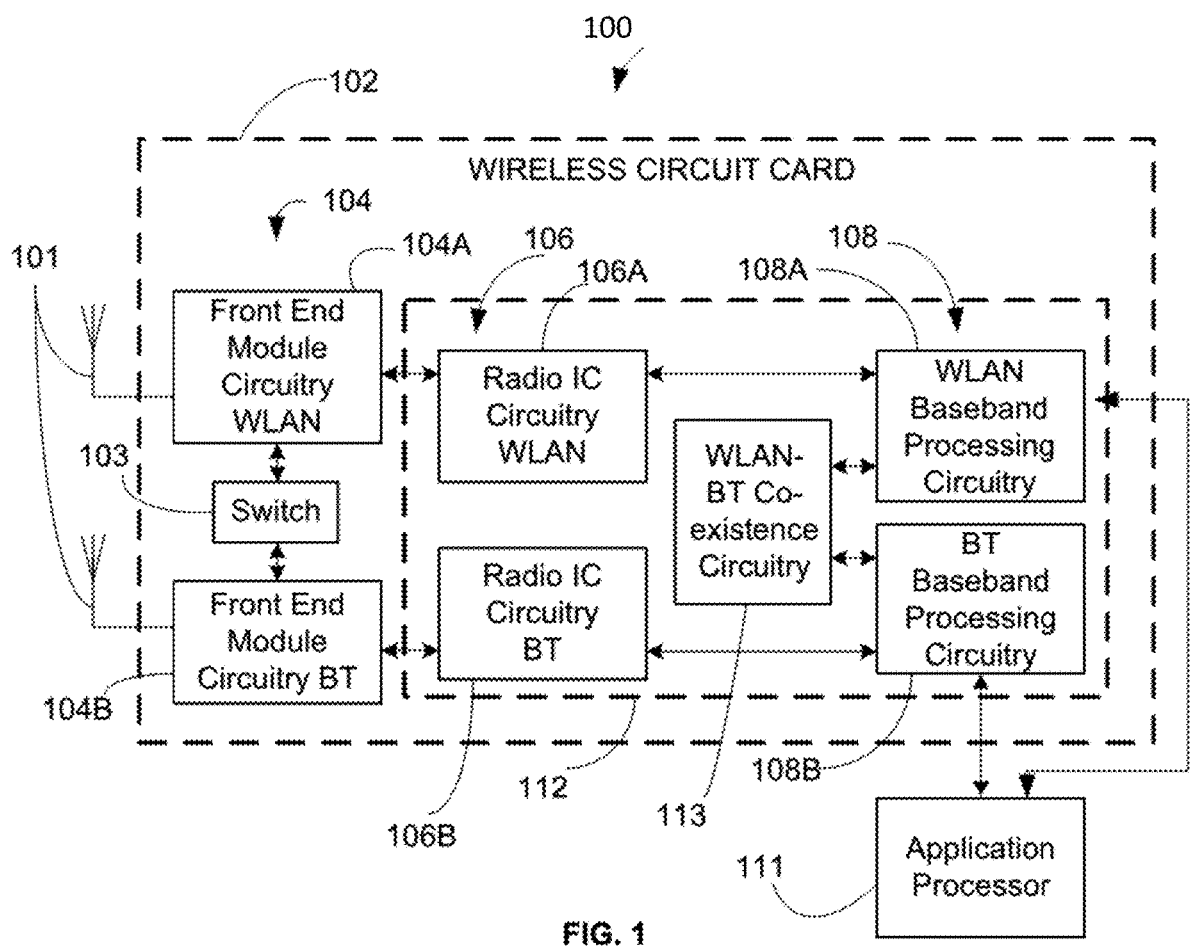
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
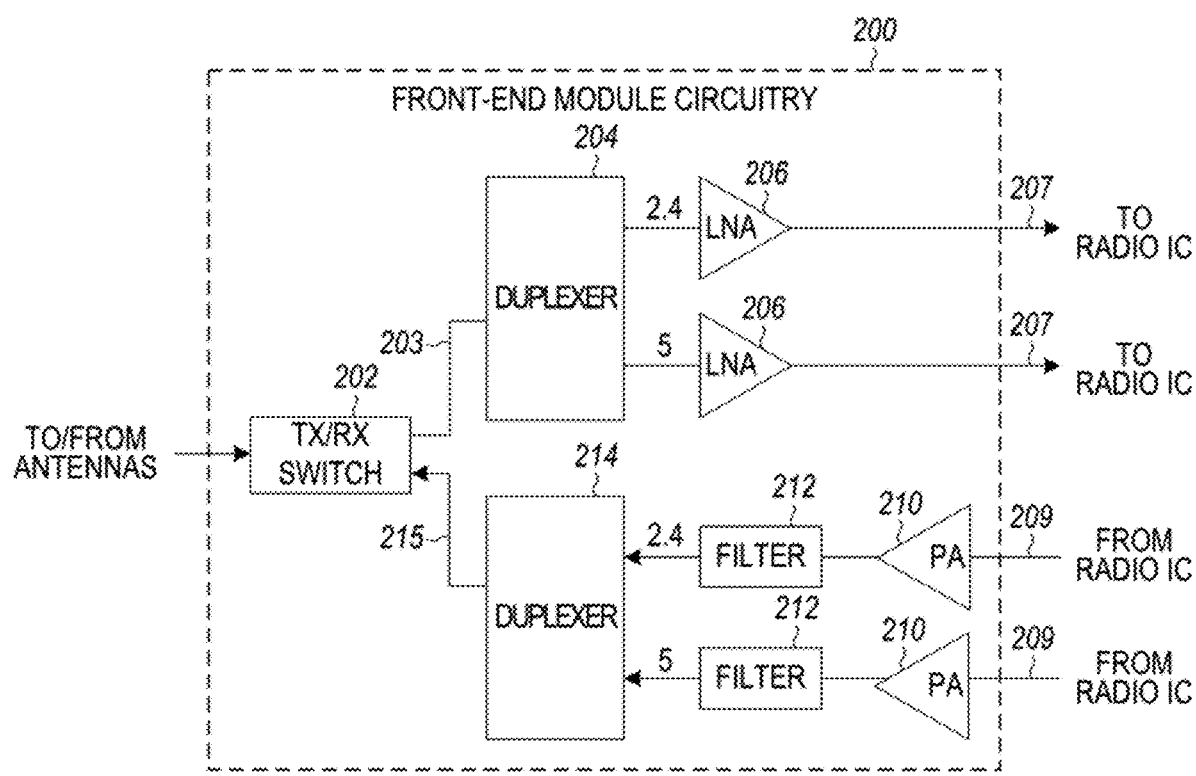
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
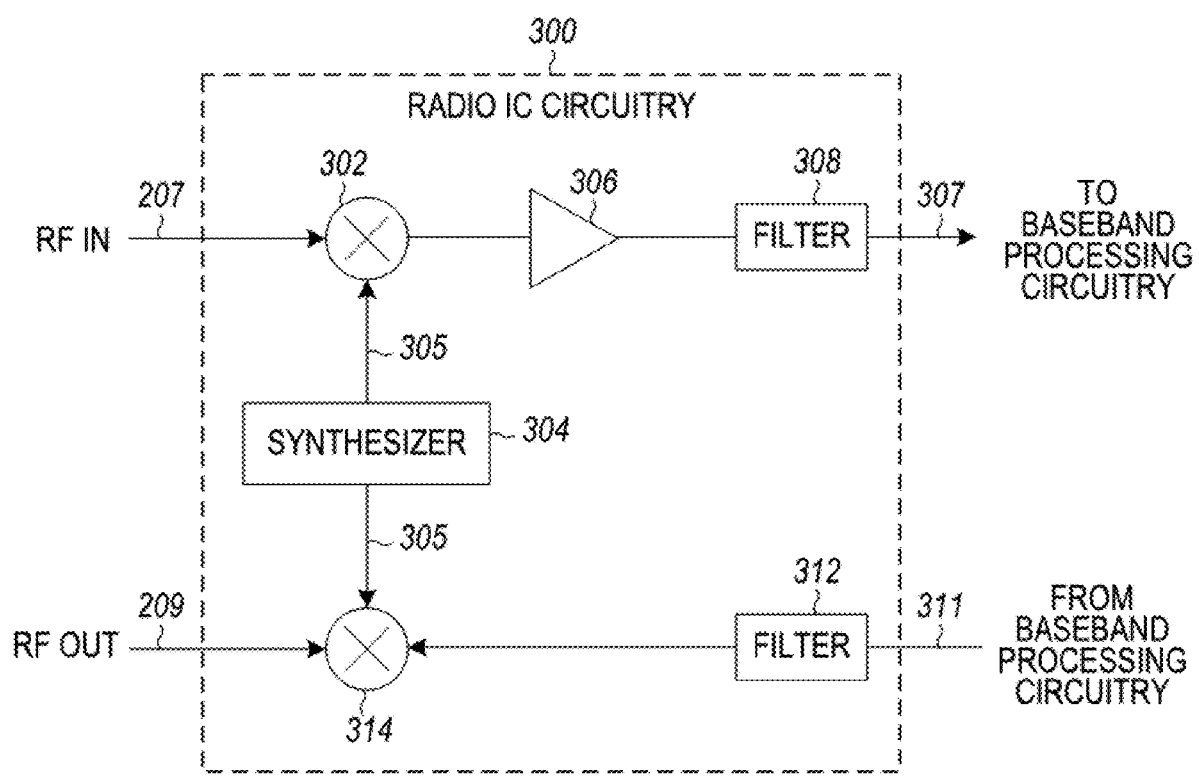
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
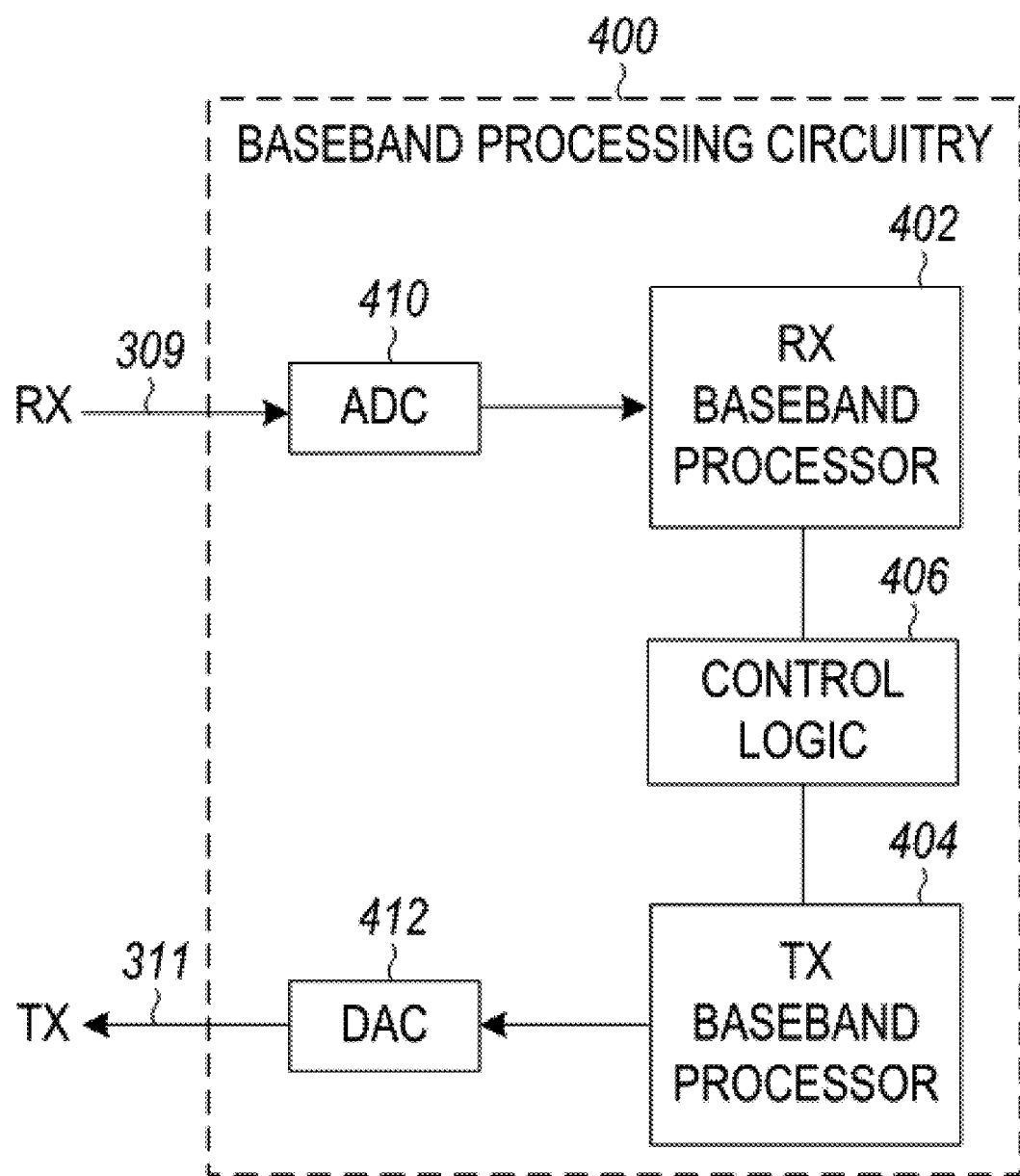
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
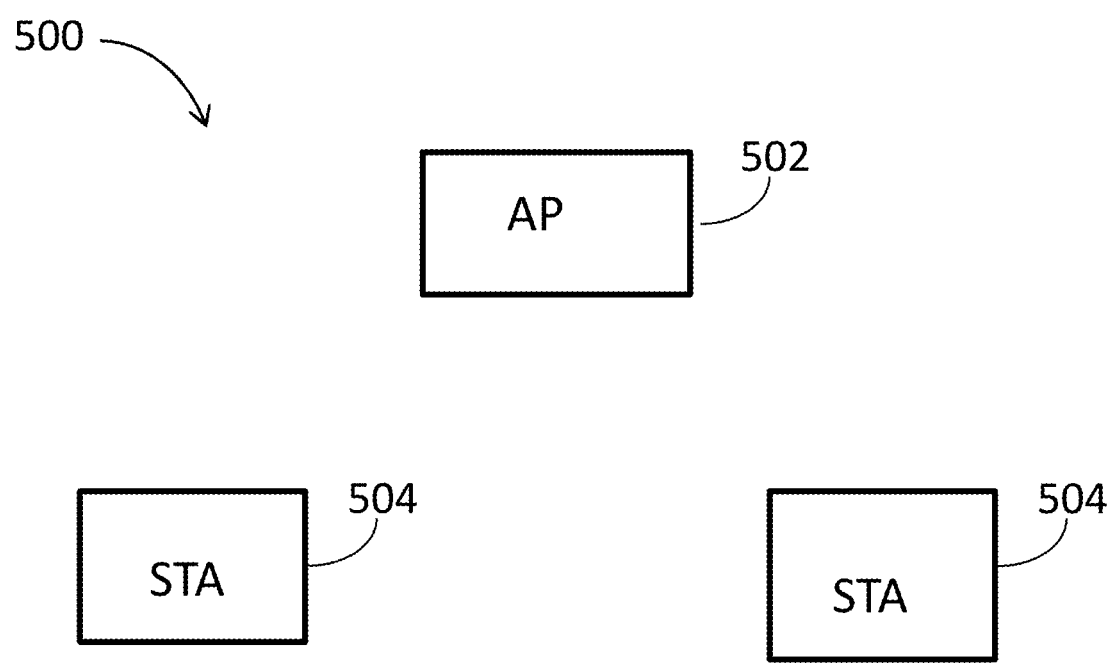
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. Embodiments are not limited to the number of elements (such as APs 502, STAs 504 and/or other) shown in FIG. 5.

In some embodiments, the AP 502 may communicate with one or more of the STAs 504. Embodiments are not limited to a single AP 502, as the WLAN 500 may comprise one or more APs 502, in some embodiments. In some embodiments, the AP 502 may be a base station. The AP 502 and/or STAs 504 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The AP 502 and/or STAs 504 may operate in accordance with one or more of IEEE 802.11 a/b/g/n/ac/ad/af/ah/aj/ay, or another legacy wireless communication standard. In some embodiments, the STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the AP 502, STA 504, and/or other device may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
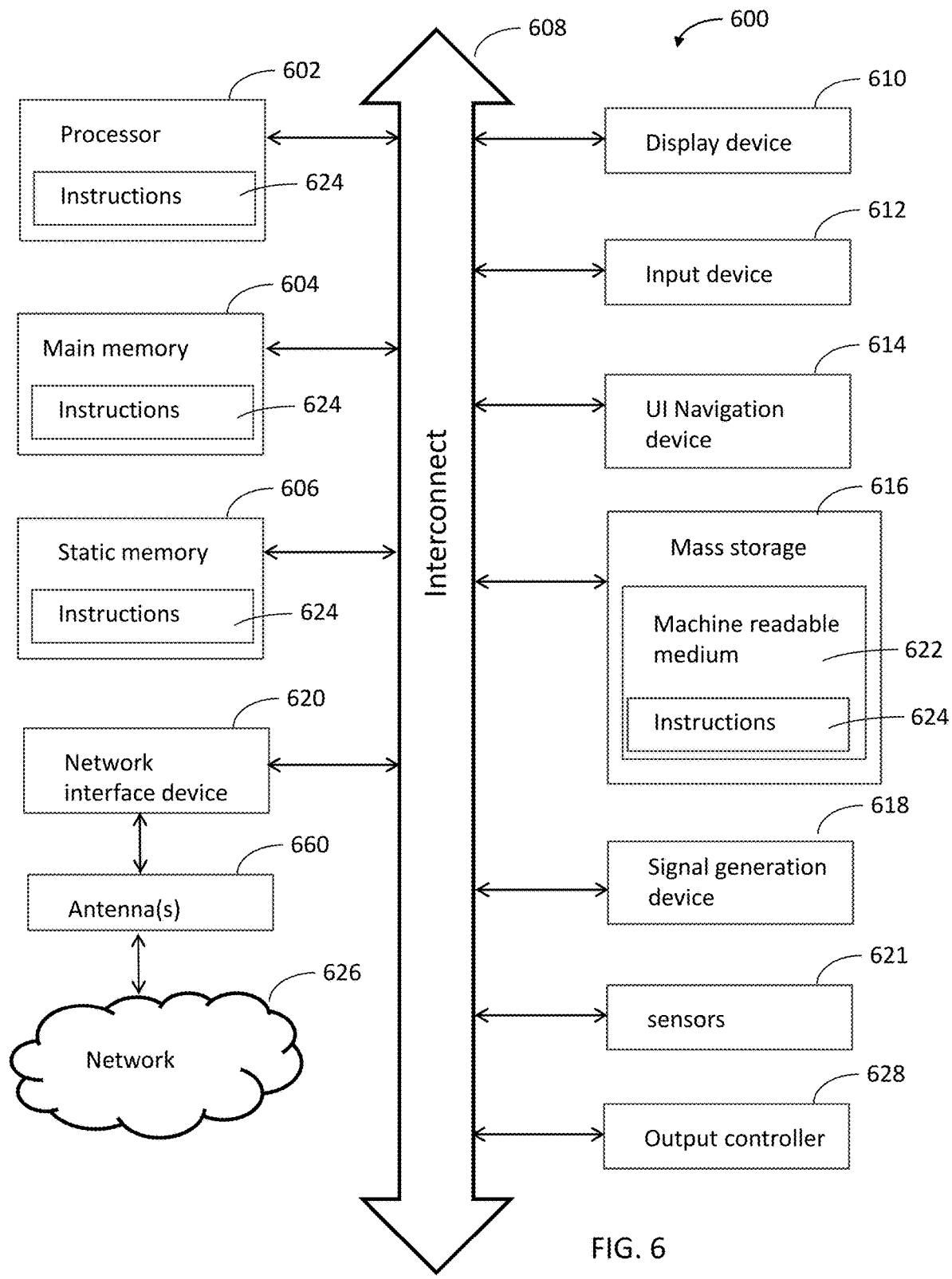
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
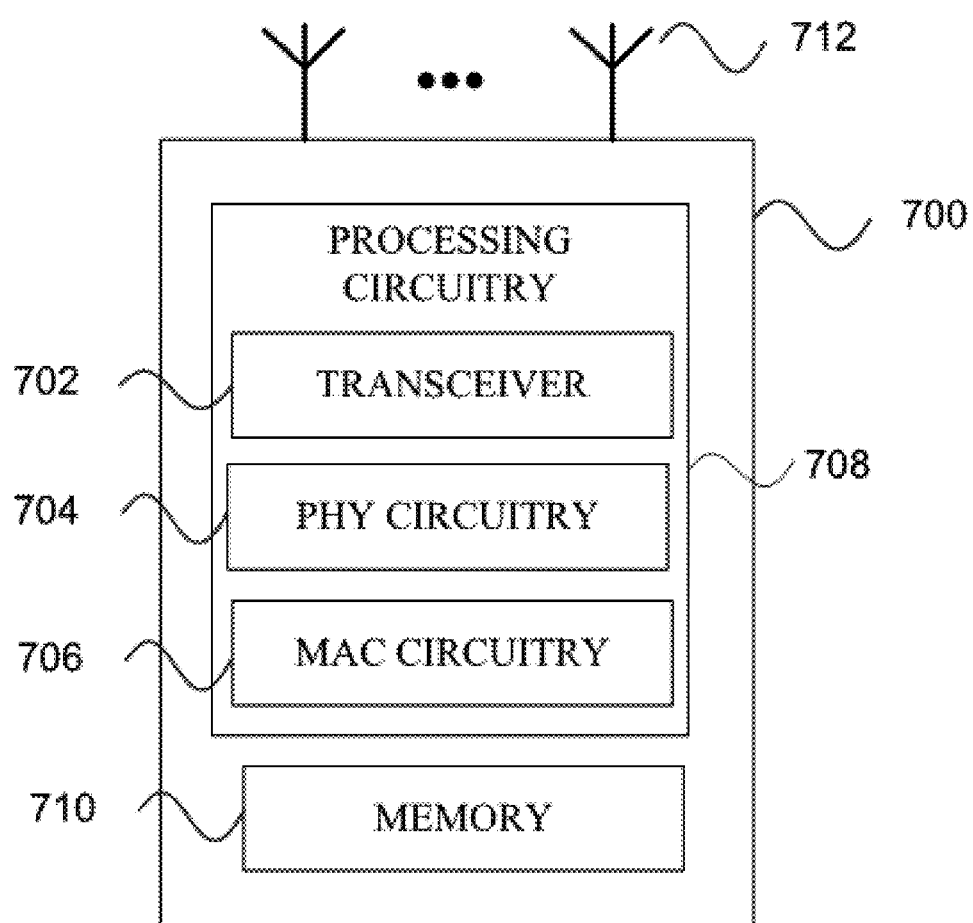
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the STA 504 may be configurable to operate as a responding STA 504 in a null data packet (NDP) based ranging procedure with an initiating STA 504 that is unassociated with the responding STA 504. When the STA 504 operates as the responding STA 504, as part of the NDP based ranging procedure, the responding STA 504 may: encode, for transmission, a broadcast frame that indicates one or more ranging parameters related to ranging capability of the responding STA 504 or ranging capability of the initiating STA 504; decode, from the initiating STA 504, an NDP announcement (NDPA) frame that indicates transmission of a first NDP from the initiating STA 504; detect the first NDP from the initiating STA 504; encode a second NDP for transmission to the initiating STA 504; and encode, for transmission to the initiating STA 504, a first location measurement report (LMR) that indicates: a reception time of the first NDP at the responding STA 504, and a transmission time of the second NDP at the responding STA 504. These embodiments are described in more detail below.

Figure 8:
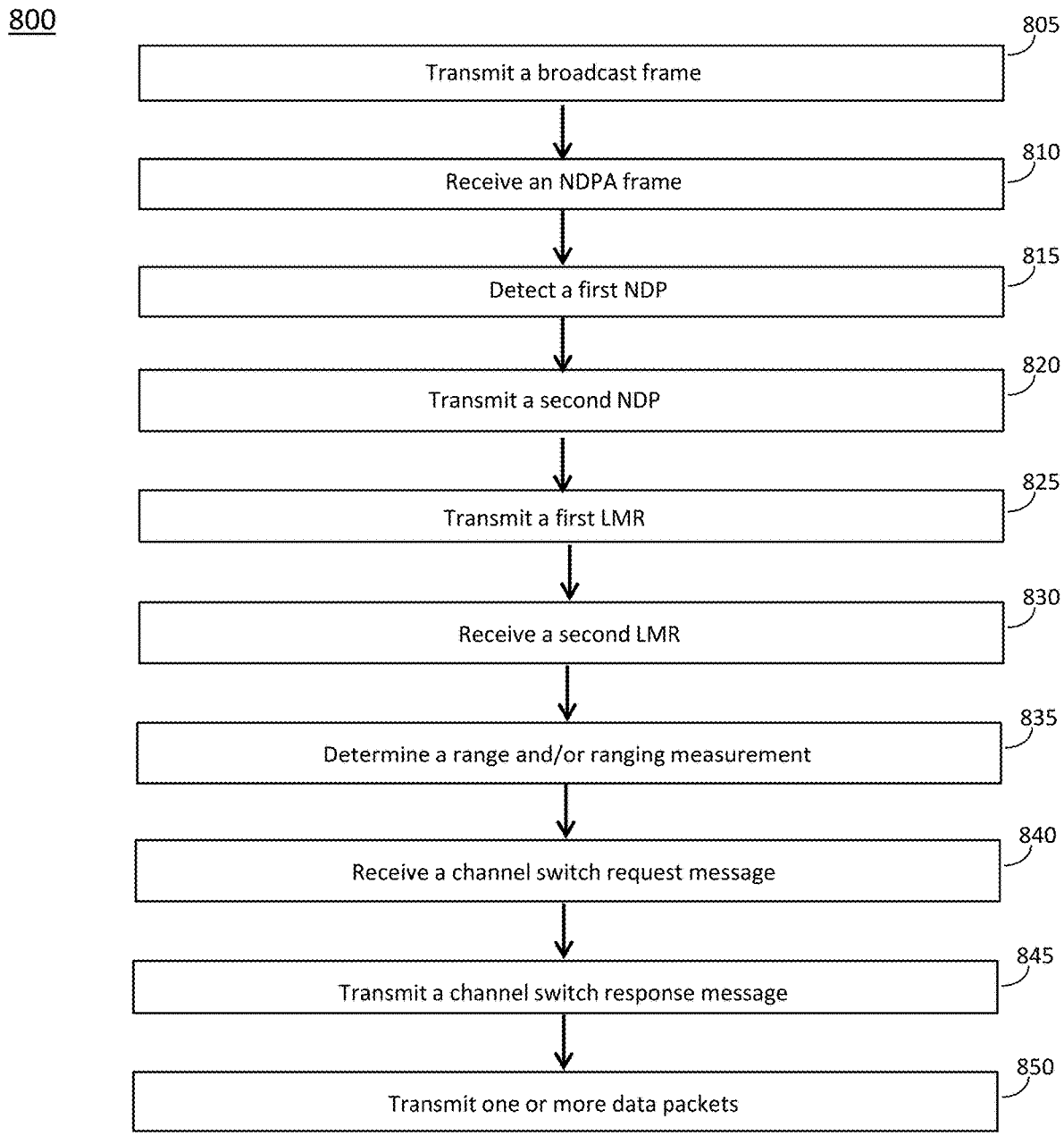
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800 may be practiced with any other suitable systems, interfaces and components.

In some embodiments, a STA 504 may perform one or more operations of the method 800, but embodiments are not limited to performance of the method 800 and/or operations of it by the STA 504. In some embodiments, another device and/or component may perform one or more operations that may be the same as, similar to and/or reciprocal to one or more operations of the method 800. In a non-limiting example, the AP 502 may perform an operation that may be the same as, similar to, reciprocal to and/or related to an operation of the method 800, in some embodiments.

The method 800 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of an AP 502, an apparatus of a STA 504 and/or an apparatus of another device. In some embodiments, an apparatus of a STA 504 may perform one or more operations of the method 800 and/or other operations. In some embodiments, an apparatus of an AP 502 may perform one or more operations that may be the same as, similar to, reciprocal to and/or related to one or more operations described herein.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the STA 504 may transmit a broadcast frame. At operation 810, the STA 504 may receive a null data packet announcement (NDPA) frame. At operation 815, the STA 504 may detect and/or receive a first null data packet (NDP). At operation 820, the STA 504 may transmit a second NDP. At operation 825, the STA 504 may transmit a first location measurement report (LMR). At operation 830, the STA 504 may receive a second LMR. At operation 835, the STA 504 may determine a range and/or ranging measurement. At operation 840, the STA 504 may receive a channel switch request message. At operation 845, the STA 504 may transmit a channel switch response message. At operation 850, the STA 504 may transmit one or more data packets.

In some embodiments, the STA 504 perform one or more operations related to a null data packet (NDP) based ranging procedure. In some embodiments, the NDP based ranging procedure may be performed between a responding STA 504 and an initiating STA 504, although the scope of embodiments is not limited in this respect. Some descriptions herein of one or more techniques, operations and/or methods may refer to such a procedure (between one initiating STA 504 and one responding STA 504). However, it is understood that one or more of those techniques, operations and/or methods may be extended to include multiple initiating STAs 504 and/or multiple responding STAs 504, in some embodiments.

In some embodiments, the STA 504 may be configurable to operate as a responding STA 504 in the NDP based ranging procedure with an initiating STA 504 that is unassociated with the responding STA 504. Although some descriptions herein may refer to such a scenario, the scope of embodiments is not limited in this respect. In some embodiments, the STA 504 may be configurable to operate as the responding STA 504 or as the initiating STA 504 in the NDP based ranging procedure. In some descriptions herein, one or more operations may be performed by a "responding STA 504," but it is understood that the one or more operations may be performed by an STA 504 configurable to operate as a responding STA 504 in some embodiments. It is also understood that an "initiating STA 504" and/or an STA 504 configurable to operate as an initiating STA 504 may perform one or more operations that are the same as, similar to, reciprocal to and/or related to the one or more operations performed by the responding STA 504, in some embodiments.

In some embodiments, when the STA 504 operates as the responding STA 504, as part of the NDP based ranging procedure, the responding STA 504 may perform one or more of: transmit a broadcast frame that indicates one or more ranging parameters (the ranging parameters may be related to ranging capability of the responding STA 504, ranging capability of the initiating STA 504, and/or other); receive, from the initiating STA 504, an NDPA frame that indicates transmission of a first NDP from the initiating STA 504; detect the first NDP from the initiating STA 504; transmit a second NDP to the initiating STA 504; transmit, to the initiating STA 504, a first location measurement report (LMR); and/or other. In some embodiments, the first LMR may indicate one or more of: a reception time of the first NDP at the responding STA 504; a transmission time of the second NDP at the responding STA 504; and/or other.

In some embodiments, the responding STA 504 may receive, from the initiating STA 504, a second LMR that indicates one or more of: a transmission time of the first NDP at the initiating STA 504; a reception time of the second NDP at the initiating STA 504; and/or other. In some embodiments, the responding STA 504 may determine a range between the initiating STA 504 and the responding STA 504. In some embodiments, the responding STA 504 may determine the range based at least partly on one or more of: the reception time of the first NDP at the responding STA 504; the transmission time of the second NDP at the responding STA 504; the transmission time of the first NDP at the initiating STA 504, the reception time of the second NDP at the initiating STA 504; and/or other.

In some embodiments, the ranging parameters may include one or more of: a number of antennas of the responding STA 504; a number of spatial time streams supported for transmission by the responding STA 504; a number of spatial time streams supported for reception by the responding STA 504; a number of antennas supported for reception by the responding STA 504; a number of repetitions supported by the responding STA 504; a feedback type for LMRs, wherein the feedback type may be immediate or delayed; a maximum time interval between two consecutive ranging measurement sequences at the responding STA 504; a minimum time interval between two consecutive ranging measurement sequences at the responding STA 504; a bandwidth used for ranging measurements at the responding STA 504; a frequency band for ranging measurements at the responding STA 504; and/or other.

In some embodiments, the responding STA 504 may transmit signaling to the initiating STA 504. In some embodiments, the signaling may indicate one or more of: a request to receive a ranging measurement report from the initiating STA 504; and/or other.

In some embodiments, one or more operations of the NDP based ranging procedure may be performed without negotiation between the responding STA 504 and the originating STA 504.

In some embodiments, the responding STA 504 may encode the broadcast frame to include a medium access control (MAC) address of the responding STA 504.

In some embodiments, the responding STA 504 and/or the initiating STA 504 may be arranged to operate in accordance with a Next Generation Vehicular (NGV) protocol.

In some embodiments, a first STA 504 may receive a channel switch request message received from a second STA 504 in a first frequency band. In some embodiments, the channel switch request message may indicate that the second STA 504 and the first STA 504 are to switch to a second frequency band for a ranging procedure between the second STA 504 and the first STA 504. In some embodiments, the first STA 504 may receive an NDPA frame that indicates a first NDP from the second STA 504. In some embodiments, the first STA 504 may receive the NDPA from the second STA 504 in the second frequency band. In some embodiments, the first STA 504 may detect the first NDP from the second STA 504 in the second frequency band. In some embodiments, the first STA 504 may transmit a second NDP to the second STA 504 in the second frequency band. In some embodiments, the first STA 504 may transmit an LMR to the second STA 504 in the second frequency band. In some embodiments, the first STA 504 may encode the LMR to include information related to one or more of: reception of the first NDP; transmission of the second NDP; and/or other. In some embodiments, the first STA 504 may transmit, to the second STA 504, a channel switch response message to acknowledge reception of the channel switch request message.

In some embodiments, the first frequency band may be a Next Generation Vehicle (NGV) frequency band. In some embodiments, the NGV band may include one or more channels of 10 mega-Hertz (MHz). In some embodiments, the second frequency band may be a wireless local area network (WLAN) frequency band. In some embodiments, the WLAN frequency band may include one or more channels of 20, 40, 80, 160, and 320 MHz. In some embodiments, the second frequency band may be in a frequency range at 2.4 GHz, 5 GHz or 6 GHz.

In some embodiments, the first STA 504 may encode a data packet for transmission in the first frequency band in accordance with a vehicle-to-everything (V2X) protocol or a vehicle-to-vehicle (V2V) protocol.

In some embodiments, the STA 504 may be configurable to operate in a Next Generation Vehicle-to-Everything (NGV) frequency band, although the scope of embodiments is not limited to the NGV frequency band. In some embodiments, the STA 504 may encode, for transmission, signaling that indicates a spectral mask of the STA 504. In some embodiments, the indicated spectral mask may be included in a plurality of predefined candidate spectral masks. In some embodiments, at least one of the candidate spectral masks may be a tight mask based on a reduced channel size in comparison to other channel sizes of other candidate spectral masks. In some embodiments, the plurality of candidate spectral masks may include a "tight mask" and/or a "relaxed mask." In some embodiments, the signaling may indicate whether the STA 504 is capable of operation in accordance with the tight mask. In some embodiments, the STA 504 may transmit one or more data packets in accordance with the indicated spectral mask. In some embodiments, the signaling may include one or more of: physical (PHY) layer signaling; medium access control (MAC) layer signaling; application layer signaling; and/or other.

In some embodiments, an apparatus of a STA 504 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

Figure 9:
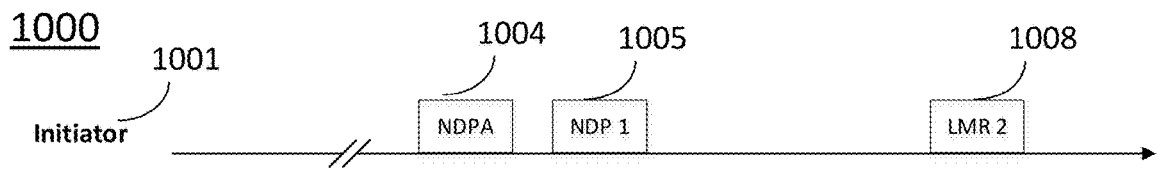
FIG. 9 illustrates an example packet in accordance with some embodiments.

FIG. 9 illustrates an example packet in accordance with some embodiments. FIGS. 10-19 illustrate example elements that may be exchanged in accordance with some embodiments. FIG. 20 illustrates example frequency resources in accordance with some embodiments. It should be noted that the examples shown in FIGS. 9-20 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-20 Although some of the elements shown in the examples of FIGS. 9-20 may be included in a WLAN standard, Wi-Fi standard, 802.11 standard, and/or other standard, embodiments are not limited to usage of such elements that are included in standards.

Some embodiments may be related to ranging for 802.11bd. Ranging may be a use case of IEEE 802.11bd. In some cases, existing ranging schemes are the FTM-based in 11mc and the NDP-based in 11az, which may require association and negotiation. For 802.11bd, two moving vehicles may pass by within a second. There may not be enough time for the association and negotiation in some cases.

One or more ranging schemes proposed herein skip the association and negotiation processes. The ranging capability and related parameters are announced in the broadcast message or some other similar frame like beacon frame in 802.11ax such that device discovery and ranging parameter acquisition happen at the same time. In addition, the MAC address instead of AID is used as the device ID so that association can be avoided. Furthermore, an early indication of the ranging frame is set in the NGV-SIG so that the channel estimate buffering and ToD preparation can start immediately thereafter. Besides the GPS location, the relative location of the ranging antenna on the vehicle (e.g. at the front or end of the car) is reported or indicated. Finally, the one-way reporting of the existing FTM scheme is modified to be bi-directional so that both of the ranging devices can get the distance timely.

One or more schemes proposed herein may enable fast ranging without the need to do association and negotiation. This may be relevant in the NGV (.11bd) standard, in some cases.

In some cases, different types of ranging protocols may be used in 802.11. One uses the long training field (LTF) of a PPDU with payloads as the ranging sounding signal. The other uses a dedicated PPDU without payloads i.e. NDP as the ranging sounding signal. One or more embodiments described herein may be related to one or more of the following aspects.

Some aspects (referred to for clarity as "1") may be related to a device Identifier. For reducing the latency of association, the MAC address or IP address or BSSID instead of AID is used as the device identifier. The MAC address or IP address or BSSID is included in the broadcast or multicast or unicast frame of the device e.g. something similar to the beacon in 802.11ac/ax. Device A may listen to the medium and find Device B and its MAC address or IP address through the broadcast or unicast frame sent by Device B. In the legacy 802.11p, devices operate in OCB (out of context of BSS) mode. There is no beacon defined there and the neighborhood discovery relies on upper layer above PHY and MAC. This causes a significant delay in discovery. For 802.11bd, using the proposed IDs in the frames sent by the device, the discovery can be speeded up.

Some aspects (referred to for clarity as "2") may be related to removal of negotiation. For reducing the latency of negotiation, the ranging capability and ranging parameters are included in the broadcast message or multicast message or similar message, for the nearby stations to know about. Example parameters may include one or more of: 1. the number of antennas; 2. the number of repetitions supported; 3. the feedback type of the location measurement reports (immediate or delayed); 4. the maximum spatial time streams can be supported for transmission; 5. the maximum number of antennas can be supported for reception; 6. the maximum or minimum time interval between two consecutive measurements; 7. the bandwidth used for measurement may be announced; 8. the band used for ranging may be announced, where the ranging channel may be in other bands such as 2.4 and 5 GHz; and 9. Other parameter(s). In addition, other information that could be included is, Device A may want to get the distance or the measurement report from Device B if Device A did a ranging measurement and provided a measurement report to Device B. Device A may indicate this requirement in its broadcast or multicast or similar message, so that only devices willing to send reports will do ranging with Device A. By reading the broadcast/multicast/unicast or similar message of Device A, Device B then knows whether it can do ranging measurements with Device A and what configuration parameters it should use for the ranging. This is different from the legacy ranging protocol that has a negotiation phase. In the legacy 802.11p, devices operate in OCB (out of context of BSS) mode. There is no beacon defined there and the neighborhood discovery relies on upper layer above PHY and MAC. For backward compatibility, the ranging parameters and requirements may be included in the upper layer message used by 802.11p (e.g. for discovery).

Some aspects (referred to for clarity as "3") may be related to antenna Location. Unlike cell phones, a vehicle is clearly much larger and therefore can have antennas which are separated a far greater distance. The antenna on a vehicle may be placed in the front and/or the rear and/or the sides. The location of the antenna may affect the measured distance between two vehicles or between the vehicle and a roadside unit. For example, the two approaching vehicles with two front mounted antennas have a measured distance shorter than two approaching vehicles with two rear mounted antennas for the same distance between the two vehicles. For collision avoidance, the measured distance between two rear mounted antennas on two approaching vehicle needs to be corrected by the distance between the sets of antennas. Therefore, it is desirable that the antenna location, with respect to the vehicle is known by the devices participating in the ranging protocol. The antenna location may be indicated in the location measurement report and/or the broadcast/multicast/unicast or similar message. Additional fields can be added to these messages such as the location measurement report (LMR), NDPA, and other ranging related frames like FTM and FTM request. For example, in an LMR, the corresponding antenna location or index may be indicated for the time of arrival (ToA) and time of departure (ToD). Namely, the receiver of the LMR would know which antenna e.g. the front or the rear antenna is used to estimate the ToA or is used to send the ranging signal. The antenna locations may be listed and indexed in the broadcast/multicast/unicast message and only the antenna index may be used in the LMR for reducing overhead. The mapping between the antennas and the P-matrix in the NGV-LTF field should also be indicated in the LMR or broadcast/multicast/unicast message. For example, antenna 1 uses the first row or column of P-matrix and antenna 2 uses the second row or column of P-matrix.

Some aspects (referred to for clarity as "4") may be related to vehicle location. Since the vehicle may be moving and the measured distance may not be accurate, the location of the vehicle is of interest. For example, the vehicle or roadside unit may broadcast its GPS location, which provides location information in addition to the measured distance. The location information may be included in the broadcast/multicast/unicast message and/or the location measurement report. We may need to include a location field in the broadcast/multicast/unicast message and/or the measurement report. In 802.11az, there is a report for location configuration information (LCI) in the location measurement report. We may reuse this format and put it in the broadcast message, the location measurement report, and other ranging related frames like FTM and NDPA, FTM request of 802.11bd.

Some aspects (referred to for clarity as "5") may be related to vehicle movement. Since the vehicle may be moving, the speed, acceleration, and the directions of the speed and/or the acceleration are helpful for predicting the location of the vehicle. Nowadays, GPS and accelerometer are widely deployed such that GPS location, speed, acceleration, and the directions of the speed and acceleration are usually available. The information can help to determine not only the current location but also predict future locations. The information can be included in the broadcast message, the location measurement report, and other ranging related frames like NDPA, FTM and FTM request.

Some aspects (referred to for clarity as "6") may be related to transmit power level. Since the distance between a transmitter and a receiver may be estimated from the transmit power and the path loss, the transmit power may be indicated in the transmitted frame for the nearby devices to estimate the distance using a certain path loss model. For example, the transmit power level may be indicated in broadcast/multicast/unicast message, location measurement report, NDPA, ranging trigger, and ACK periodically broadcasted.

Some aspects (referred to for clarity as "7") may be related to indication for buffering channel estimates. Since the ranging device receiving the sounding signal needs to buffer the channel estimates for estimating the time of arrival (ToA) and/or the angle of arrival (AoA), it is desired that the device knows the long training field (LTF) of which frame it needs to buffer not flush. The 802.11bd PPDU structure 900 under the discussion in 802.11bd is illustrated in FIG. 9. The NGV-LTF is used as the channel sounding/training signal. If the receiving device needs to estimate the ranging quantities such as ToA and AoA from the NGV-LTF, the device needs to buffer the sounding signal and process it instead of flushing it from the memory. In some designs, the receiver may not be able to decode and be aware of the estimation request in time e.g. after repeated NGV SIGNAL field (R-NGV-SIG). In this case, the receiver needs to buffer the channel estimates for every PDDU ranging or non-ranging until the content of the PPDU is known. Besides, the earlier the receiver knows the ranging processing request the earlier the receiver can start processing the signal. This is particularly useful for immediate reporting. Thus it is highly desirable to put an indication of the ranging processing request before the NGV-LTF. For example, one bit or one entry of a field in NGV-SIG or R-NGV-SIG may be used. There are currently unused bits in NGV-SIG, which can be used for indicating the ranging processing request. For another example, the polarity or phase of R-NGV-SIG (or R-L-SIG) with respect to NGV-SIG (or L-SIG) may be used for indicating the ranging processing request. For a third example, the indication may be signaled by the remainder of the length field (LENGTH) in L-SIG such as 2 mod 3 or 1 mod 3. The early indication of the ranging processing request is particularly useful for FTM-based scheme described subsequently, where there is no preceding NDPA frame to indicate the coming of the ranging signal. If the receiver detects the early indication, the channel estimation of L-LTF and L-SIG and R-L-SIG can also be used for ToA estimation.

Some aspects (referred to for clarity as "8") may be related to additional channel for ranging. In some cases, the ranging accuracy can be significantly improved by increasing the measurement bandwidth and it is desirable to use a wideband channel than a narrow band channel. However, there is limited bandwidth at the 5.9 GHz band used by 802.11p. The maximum ranging bandwidth is 20 MHz. In contrast, there are a lot more bandwidth available at 2.4, 5, and 6 GHz bands, respectively. In addition, there will be two 802.11 radios in the vehicle in near future, one maybe for infotainment and the other for V2V/V2X. The infotainment radio can operate at channels with 20/40/80/160/320 MHz bandwidths. If FTM or 802.11az is implemented on the infotainment radio, high accuracy ranging is available. To leverage the wider bandwidth, the V2V/V2X radio can announce the ranging parameters for its infotainment radio. For example, the station ID (e.g. AID), the channel index, the channel bandwidth, the ranging capabilities, the antenna configurations, and the sounding repetition number of the infotainment radio can be broadcasted at the 5.9 GHz V2V/V2X channel by the V2V/V2X radio. Nearby stations can go to the announced channel and conduct the ranging there. Location measurement report can be sent at either the announced channel or the V2V/V2X channel. Additional negotiation or association may be conducted at the announced channel.

Figure 10:
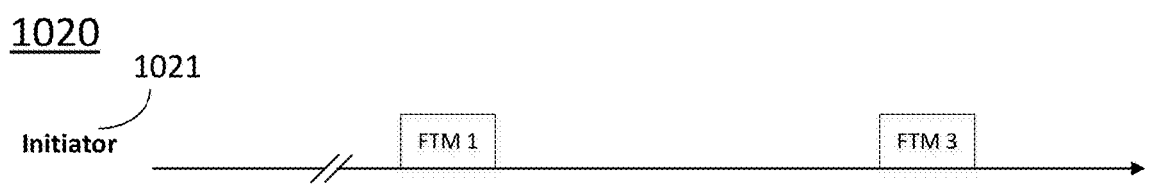
FIG. 10 illustrates example elements that may be exchanged in accordance with some embodiments.
Figure 10:
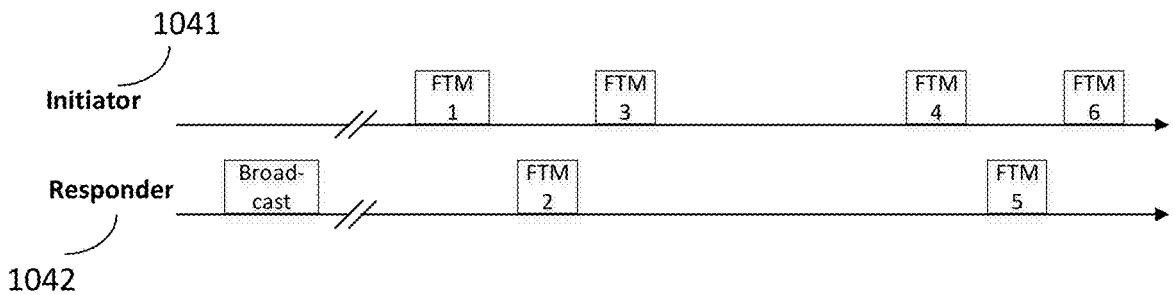

Some embodiments may be related to NDP-based ranging. An example scheme 1000 is illustrated in FIG. 10. The initiator 1001 (or the responder 1002) may be on a vehicle or a roadside infrastructure device e.g. traffic light. The initiator 1001 may identify the responder 1002 from the broadcast/multicast/unicast message 1003 sent by the responder 1002, where the MAC address or BSSID is listed. Additionally, the initiator 1001 may know the GPS location, the speed, and transmit signal power level of the responder 1002 from the received beacon. The initiator 1001 may estimate the distance between the initiator 1001 and the responder 1002 using the GPS, the speed, and/or the transmit power level. For obtaining an accurate distance measurement, the initiator 1001 may want to do ranging with the responder according to the ranging capability and ranging parameters listed in the broadcast/multicast/unicast message 1003. The initiator 1001 sends an NDPA frame 1004 to the responder 1002 whose MAC address is in the receiver address field (RA). Besides, the NDPA 1004 specifies the configurations of the subsequent NDP frames (e.g. repetition number and antenna number) sent by the initiator 1001 and the responder 1002, respectively. Furthermore, the requirements of the location measurement report (LMR) are also specified so that the responder knows what to report. If the responder requests an LMR from the initiator 1001 by setting an indication in the broadcast/multicast/unicast message, the NDPA 1004 may indicate that there is an LMR (e.g. LMR2 in 1000) from the initiator 1001 to the responder 1002 and the feedback type of this initiator 1001 to the responder 1002 LMR can also be indicated in NDPA 1004. For reducing the latency, the measurement report in the LMR may be of the immediate type instead of delayed type. For simplicity, 802.11bd may only define immediate reporting. However, for low complexity, delayed reporting may be preferred by some vendors. If both immediate and delayed reporting are supported by 802.11bd, a device may indicate the supported reporting type in the broadcast/multicast/unicast message or NDPA 1004 or LMR. LMR 1 (1007) carries the time stamps t2 and t3 and the LMR 2 (1008) carries time stamps t1 and t4.

Some embodiments may be related to FTM-Based Ranging. An example scheme in 1020 in FIG. 10 requires 4 or 5 frames. The upside is the flexibility and the downside is the overhead. For reducing the overhead, we modify the FTM protocol defined 802.11mc. Again, the broadcast/multicast/unicast message 1023 is used to announce the device ID and the ranging capabilities/parameters for removing or reducing the association and negotiation overheads. In the measurement phase, two frames are sent by the initiator 1021 and the responder 1022, respectively for each measurement round as illustrated in 1020. In 1020, the initiator 1021 first sends a frame denoted as FTM 1 to the responder. After receiving the frame i.e. FTM 1, the responder 1022 sends a frame denoted as FTM 2 to the initiator 1021 within SIFS time. The first round of measurement consists of the two transmissions. The channel sounding signals and the ranging sounding signals are the long training fields in the two frames i.e. FTM 1 and FTM 2. The long training fields are also used for demodulating the payloads of the two frames. In the second round of measurement, the initiator 1021 sends FTM 3 to the responder 1022 and the responder 1022 sends FTM 4 to the initiator within SIFS time. In the payloads of the measurement frames FTM 1-4, measurement results such as ToA, ToD, and AoA may be reported. The frames FTM 1-4 may be of the type of FTM similar to the FTM ranging defined in 802.11mc. It should be noticed that only the initiator 1021 knows the distance after FTM 1 and FTM 2 if the responder 1022 reports the ToA of FTM 1 and the ToD of FTM 2 in FTM 2. If the responder 1022 requires the distance as well, the next frame sent by the initiator, i.e. FTM 3, may include the ToA of FTM 2 and the ToD of FTM 1 (or the distance estimated by the initiator). However, the duration between the two rounds of measurement may be long e.g. 50 ms and the vehicle may have moved a non-negligible amount based on speed.

A proposed scheme is illustrated in 1040 in FIG. 10, wherein three frames are sent in each measurement round. Both the initiator 1041 and the responder 1042 can estimate the distance after the three frames. The first frame of each measurement round e.g. FTM 1 and FTM 4 in FIG. 4 may be a FTM request frame or an NDPA frame or a ranging trigger frame or an FTM frame. In each round, the initiator 1041 sends the first frame to sound the channel for the responder and ask the responder 1042 to sound the channel for the initiator 1041. After receiving the first frame e.g. FTM 1 and FTM 4, the responder 1042 may send the second frame e.g. FTM 2 and FTM 5 within a certain time e.g. SIFS. The second frame may sound the channel for the initiator 1041 and report the measurement results estimated from the first frame of each measurement round. The third frame of each measurement round may be skipped if the responder 1042 does not need an immediate report from initiator 1041. If the responder 1042 needs the immediate report from the initiator 1041, the initiator 1041 may send the third frame for each measurement round, which reports the measurement results estimated from the second frame of the measurement round e.g. FTM 2 and FTM 5 in 1040.

In some embodiments, for giving the other ranging party e.g. the responder more preparation time, a handshaking may be added to the options in 1000, 1020, 1040 before the measurement rounds. The handshaking may consist of two frames or one frame. An example is shown in 1100 in FIG. 11. The initiator 1101 sends the responder 1102 a frame e.g. FTM request to trigger the ranging measurement. The responder 1102 sends an Ack to respond to the initiator 1101. The Ack may be skipped in some embodiments. After the handshaking, the measurement exchange starts.

In the previous options, the initiator sends the first frame in each measurement round. In the conventional FTM scheme defined in 802.11mc, the responder sends the first frame in each measurement round. The proposal here is to modify the previous FTM-based options as follows; In each measurement round, after the handshaking, the responder may send the first frame, the initiator sends the second, and the responder may or may not send the third. If the third frame is sent, the initiator can get the immediate measurement report of the measurement round. Two examples are shown in 1120 and 1140. In 1140, the Ack of the FTM request is skipped. The duration between the last handshaking frame and the first measurement frame i.e. FTM 1 in the figures can be SIFS or longer. In 1120, an example of FTM-based ranging with a 2-frame handshaking is shown, wherein the responder 1122 sends the first frame in each measurement round. In 1140, an example of FTM-based ranging with a 1-frame handshaking is shown, wherein the responder 1142 sends the first frame in each measurement round.

Figure 11:
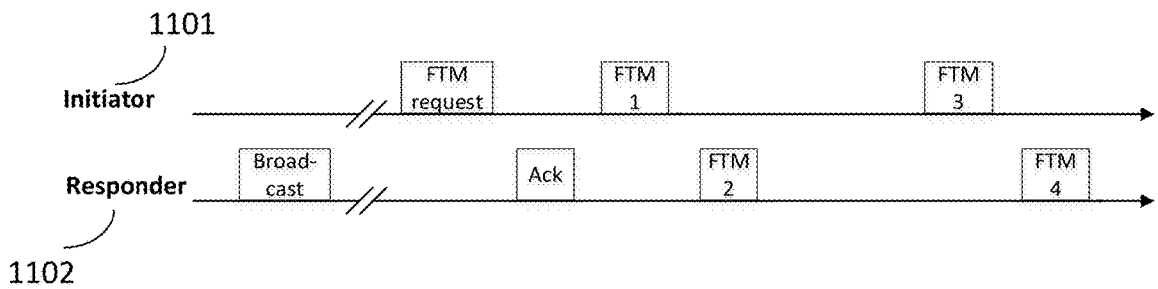
FIG. 11 illustrates example elements that may be exchanged in accordance with some embodiments.
Figure 11:
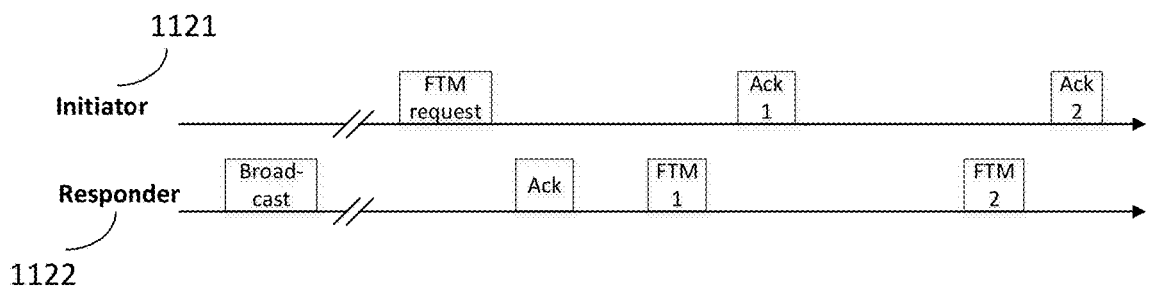
Figure 11:
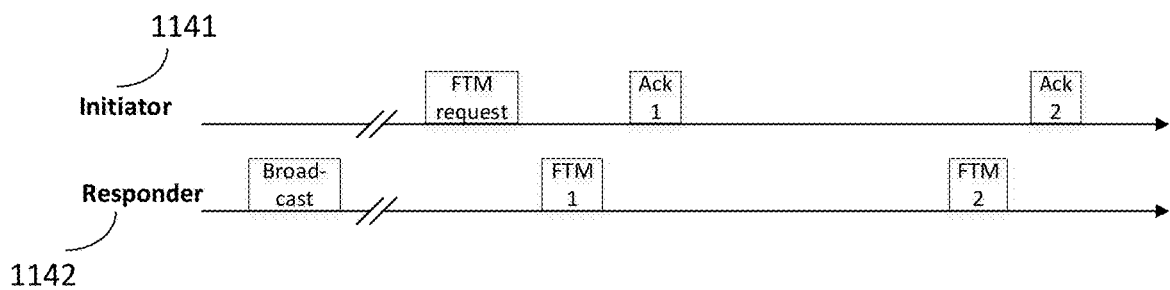

Regarding the frame type of the FTM frames in FIGS. 10-11, there are at least two options. They can be a management frame or a control frame. There are pros and cons. A management frame usually does not require an immediate response i.e. within SIFS time. However, it is easier to add payload fields to a management frame than to a control frame. In contrast, a control frame usually requires immediate response. However, it is harder to add payload fields to a control frame than to a management frame. For addressing our need, we can either define a management frame type requiring an immediate response or define a control frame carrying the measurement report. Another option is to use a control wrapper for the control frame, where the measurement report is carried in the wrapper e.g. in the HT control field.

Some embodiments may be related to sounding bandwidth extension for NGV ranging. The Next Generation Vehicle group (NGV) in IEEE 802.11 are developing solutions for future wireless communications among vehicles and infrastructures e.g. V2V and V2X. Ranging and positioning are two of the usage cases. The channel bandwidth for V2V and V2X is usually less than or equal to 10 MHz i.e. 5 or 10 MHz since there are less than 100 MHz at 5.9 GHz allocated for the V2V and V2X. In our simulations using bidirectional soundings like 802.11az, the ranging accuracy significantly drops as the bandwidth degreases. For example, 80 MHz bandwidth can achieve a sub-meter accuracy with multiple measurements and multiple antennas. However, 10 MHz bandwidth usually has errors of a few meters e.g. 5 meters. These errors may not be acceptable from a safety perspective for some of the V2V and V2X applications.

In some embodiments, for high ranging or positioning accuracy, a bandwidth wider than 10 MHz may be used for sounding the channel. Since the NGV devices need to monitor a channel in the 5.9 GHz band, some of the control and management information can still be sent on the 5.9 GHz channel and the wideband channel sounding signal can be sent over another channel such as the ones with 20/40/80/160 MHz on 6, 5, or 2.4 GHz. In some cases, the sounding bandwidth can be increased by several times such that sub-meter accuracy can be achieved. In addition, the implementation complexity of the proposal is low since existing ranging solutions i.e. 11az or 11mc can be reused.

In some embodiments, a device may dynamically jump to a channel wider than the public safety channel for sending the ranging signal so that the ranging accuracy is improved due to the wider bandwidth. Since the ranging requires bi-directional soundings, it may be desired that soundings in both directions are on the wider channel. In some cases, only one of the two-way soundings may be sent on the wider channel if there is no available channel for the other way of sounding. In this case, the accuracy improvement is limited.

The bandwidth of the conventional channel for vehicle applications such as V2V, V2X, V2I, V2P, and vehicle platooning is small i.e. 5 or 10 MHz. In contrast, the bandwidth of the conventional channel for WiFi data communications such as 11a/b/g/n/ac/ax is much wider i.e. 20/40/80/160 MHz. The wider the bandwidth the more accurate the ranging can achieve. In the rest of the disclosure, we loosely refer to the channel for conventional vehicle applications as 10 MHz channel and the channel for conventional data applications as 80 MHz channel, respectively. In general, the supported bandwidth usually varies for different WiFi devices and different bands. For example, in 2.4 GHz, the maximum bandwidth is 40 MHz, and not all STAs support it. In 5 GHz, the maximum bandwidth is 160 MHz, and not all STAs support it. We assume that a specific capability element for different bands will be specified somewhere. This can be achieved through including HE/VHT/HT capability element and link the capability element to specific bands.

To facilitate the idea, AP and STA may exchange multi-band capability in NGV bands e.g. via beacon. The multi-band capability specifies the bandwidth, data rate, or MAC addresses that can be used in another band. One example is to have a general element for each available band with necessary band information and sub-elements like HE/VHT/HT capability.

In some embodiments, it may be assumed that the same MAC address or AID is used in both channels for the device. If AP or STA has concurrent radios, this may not be the case. In this case, the AP may broadcast its 80 MHz channel location e.g. channel ID and the AP's ID e.g. BSS ID or MAC address using the NGV 10 MHz channel, where the wideband ranging/positioning is supported. After receiving the information e.g. via the AP's beacon on the 10 MHz channel, the STA may do the ranging/positioning on the 80 MHz channel with the AP.

Figure 12:
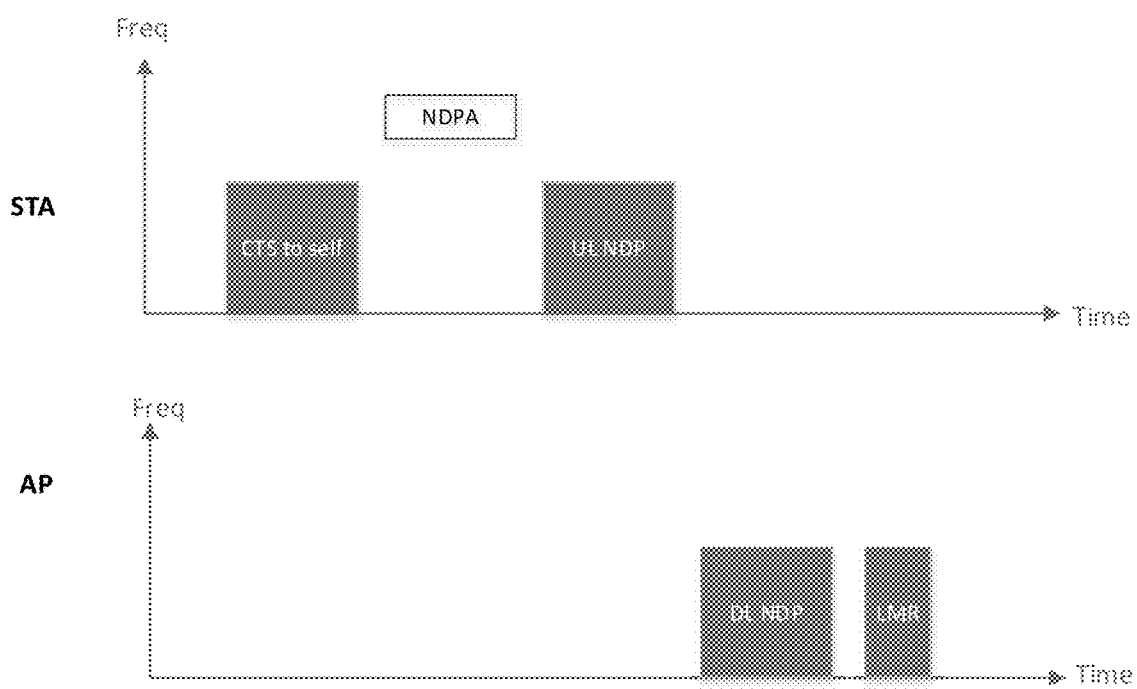
FIG. 12 illustrates example elements that may be exchanged in accordance with some embodiments.

The idea of sounding bandwidth extension is illustrated in FIG. 12, where single user ranging is shown. Most of the components are already in the developing 802.11az. In this example, we assume the AP and the STA can only choose one channel (e.g. a 10 MHz public safety channel on 5.9 GHz or a 80 MHz data channel on 5.2 GHz) to transmit or receive. From the left to the right, the STA first contends for an 80 MHz channel on 5.2 GHz and reserves it by sending a frame e.g. CTS to self, which sets a TXOP duration covering the ranging measurement. The STA then contends for the 10 MHz public safety channel on 5.9 GHz that the AP monitors. If the channel is available, the STA initiates the ranging measurement by sending a ranging NDPA to the AP. The NDPA tells the AP where the actual measurement channel is located. Following the NDPA, both the STA and the AP switches to the 80 MHz channel reserved by the STA. The STA sends an uplink (UL) NDP sounding frame on the reserved 80 MHz channel to the AP. The AP receives the UL NDP and sends a downlink (DL) NDP. Since DL NDP is short i.e. about the same duration as an ACK frame and ACK frame is sent without CCA, the AP may not do the CCA similar to sending an ACK. This may simplify the AP's operation. After the bidirectional soundings, the AP sends the location measurement report (LMR) over the reserved 80 MHz channel. Or, the LMR can be sent over the 10 MHz public safety channel. The channel reservation with the CTS to self may be optional. The gap between the NDPA and the UL NDP may be longer than SIFS so that the STA can do channel switching, CCA, and channel contention. In FIG. 12, an example 1200 of single user ranging with extended sounding bandwidth is shown. White box and blue boxes are for 10 MHz channel and 80 MHz channel, respectively. In FIG. 12, the STA reserves the 80 MHz channel before the 10 MHz one. Alternatively, the STA may reserve the 10 MHz channel before reserving the 80 MHz one. For example, when the 10 MHz channel may be harder to get, the STA may send a frame e.g. RTS to the AP or a frame e.g. self-CTS to the STA itself for holding the 10 MHz channel before reserving the 80 MHz one. After reserving the 80 MHz channel e.g. by sending a self-CTS, the STA may start the measurement by sending an NDPA over the 10 MHz channel to the AP.

In the previous two examples, channel reservations are applied before the ranging measurement. Since the measurement duration is short, the channel reservation may be skipped. Namely, the channel reserving frames e.g. self-CTS may be optional since the ranging measurement frames e.g. NDPA and NDP are short such that there is only a small waste when the AP can't respond to the NDPA and DL NDP. The STA may contend for the 10 MHz channel. After CCA passes, the STA sends the NDPA without reserving the 80 MHz channel. If the 80 MHz channel is available, the STA sends the UL NDP to the AP. Otherwise, the UL NDP is not sent. If the AP receives the NDPA, the AP may go to the 80 MHz channel for receiving the UL NDP. If the AP doesn't receive the UL NDP, the AP may go back to the 10 MHz channel without sending the DL NDP. If the UL NDP is received (and the channel is available), the AP may send the DL NDP and the LMR. Since the DL NDP has a short duration similar to ACK, the AP may send the DL NDP without CCA.

In some cases, the time spacing between the NDPA and the UL NDP may be equal to or greater than SIFS so that the AP can do the CCA at 80 MHz for sending the DL NDP and the LMR. Since the bandwidths of 10 MHz and 80 MHz are different, the time required for detecting the short preamble may be different for 10 MHz channel and 80 MHz channel. Usually, the SIFS is longer for 10 MHz than 80 MHz. Therefore, after receiving an instruction frame on a narrower channel for switching to a wider channel such as NDPA, trigger frame, and channel switch request/announcement, a shorter SIFS that is for the wider channel may be used between the instruction frame and the subsequent frame on the wider channel. However, since the channel switching may take some time, a spacing longer than the shorter SIFS e.g. the longer SIFS may be used.

Figure 13:
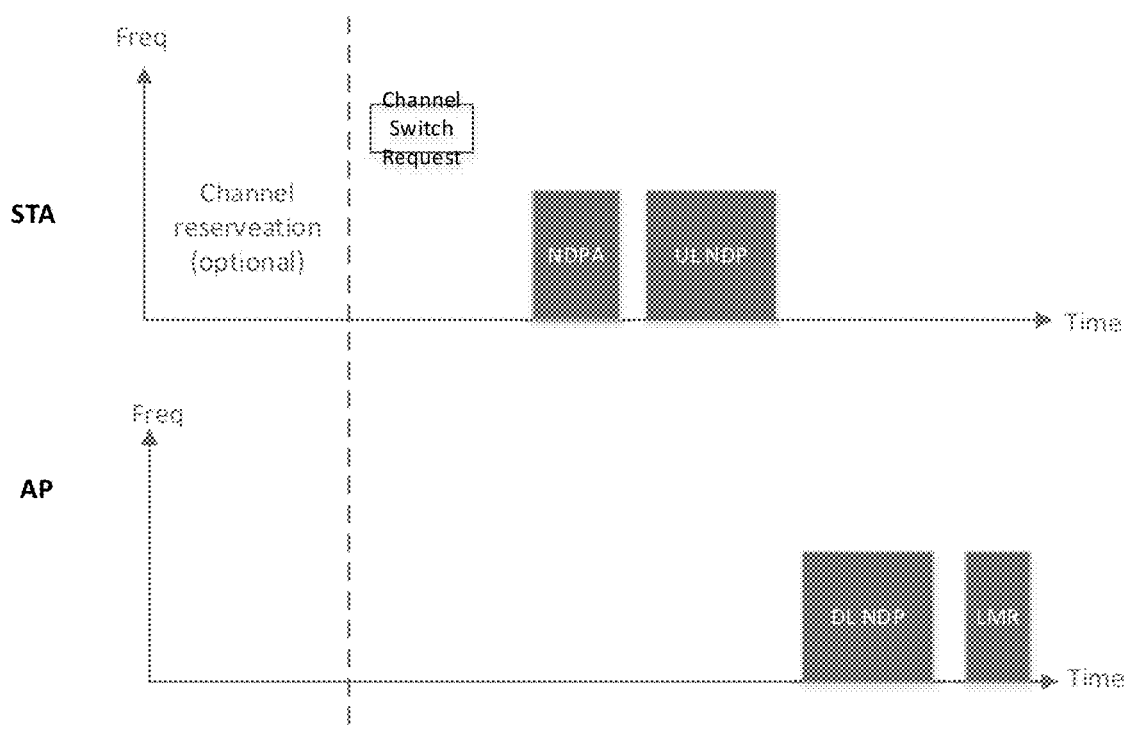
FIG. 13 illustrates example elements that may be exchanged in accordance with some embodiments.
Figure 14:
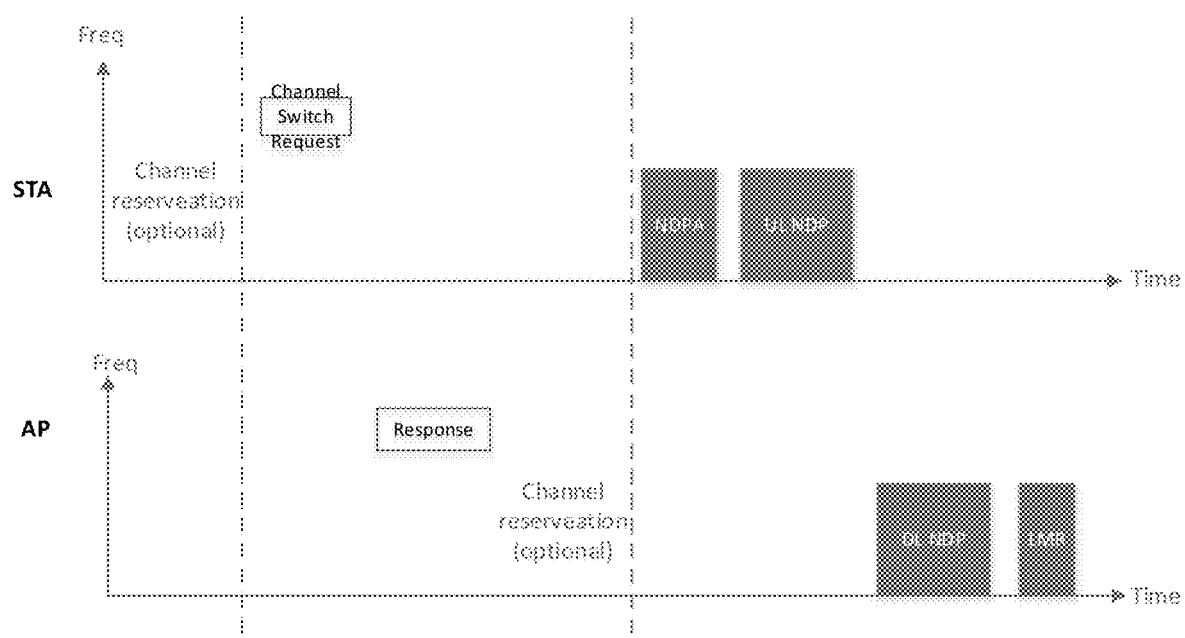
FIG. 14 illustrates example elements that may be exchanged in accordance with some embodiments.

As an alternative, the STA may do a complete ranging sequence i.e. from NDPA to LMR all at the extended channel as illustrated in FIGS. 13 and 14. This alternative maximizes the reuse of the existing ranging implementation for 11mc and 11az. The whole process may consist of three parts: 1) channel reservation, 2) channel switch; and 3) ranging measurement. The channel reservation may be optional. The ranging devices i.e. STA and AP may reserve the 80 MHz and/or the 10 MHz channel for the ranging and/or the channel switching. The channel switching moves the ranging operations from the original 10 MHz channel to the extended 80 MHz channel. There may be several ways to do it. The fastest one is illustrated in FIG. 13. The STA sends a frame (e.g. a channel switch request/announcement) to the AP for switching the channel. The channel switch request/announcement frame can be a management frame that requires an ACK frame in response. The channel switch request/announcement can indicate the channel to be used for sounding, the duration to stay in the channel, the functions to be performed in the channel (like sounding). The channel switch request can also indicate the future time to start the operation like sounding. If the channel switch request/announcement is a broadcast frame or a multicast frame (having indication to more than one STAs), the channel switch request/announcement may not require an acknowledgement from a specific STA. The broadcast or multicast channel switch request/announcement can be sent multiple times to make sure that all the STAs required for channel switch get the channel switch request.

A potential downside is that the STA may not know whether the AP is ready to switch or is available at the 80 MHz channel before the ranging. For example, if the AP may not receive the channel switch request/announcement or the 80 MHz channel is busy or AP may take longer time to do channel switch or AP is current having operation with another STA, the AP may not do the ranging at the specific time after the channel switch request transmission. However, since all the ranging frames are short, the loss is small even though the AP can't do the ranging occasionally after the channel switch request/announcement is sent.

In FIG. 13, an example 1300 of single user ranging mode with channel switch request is shown. White box and blue boxes are for 10 MHz channel and 80 MHz channel, respectively.

FIG. 14 illustrates another channel switching scheme 1400. There are more hand shakings in 1400 than in 1300. After receiving the channel switch request, the AP sends a channel switch response frame e.g. an ACK on the 10 MHz channel (or the 80 MHz channel) so that the STA knows the AP received the request and will switch (or already switched) to the 80 MHz channel. The channel switching request/response frame may be a management frame, which may require separate ACK for unicast channel switching request/response frame separately. The channel switch request/response frame may an action-no-ACK frame, which doesn't require an ACK.

In addition, the response frame may tell the other devices that the AP will leave the 10 MHz channel for some time e.g. setting the TXOP duration to the end of LMR so that the other devices will not send frames to the AP. Following the response frame, the STA and the AP may do an optional channel reservation for the 80 MHz channel. For one example, the AP may send a self-CTS (with a CCA). For another example, the STA may send an RTS to the AP. The AP may respond with a CTS if the 80 MHz channel is available. After the channel reservation, the range measurement may be done at the 80 MHz channel as defined in 11az. In FIG. 14, an example 1400 of single user ranging mode with channel switch request and ACK is shown. White box and blue boxes are for 10 MHz channel and 80 MHz channel, respectively.

Figure 15:
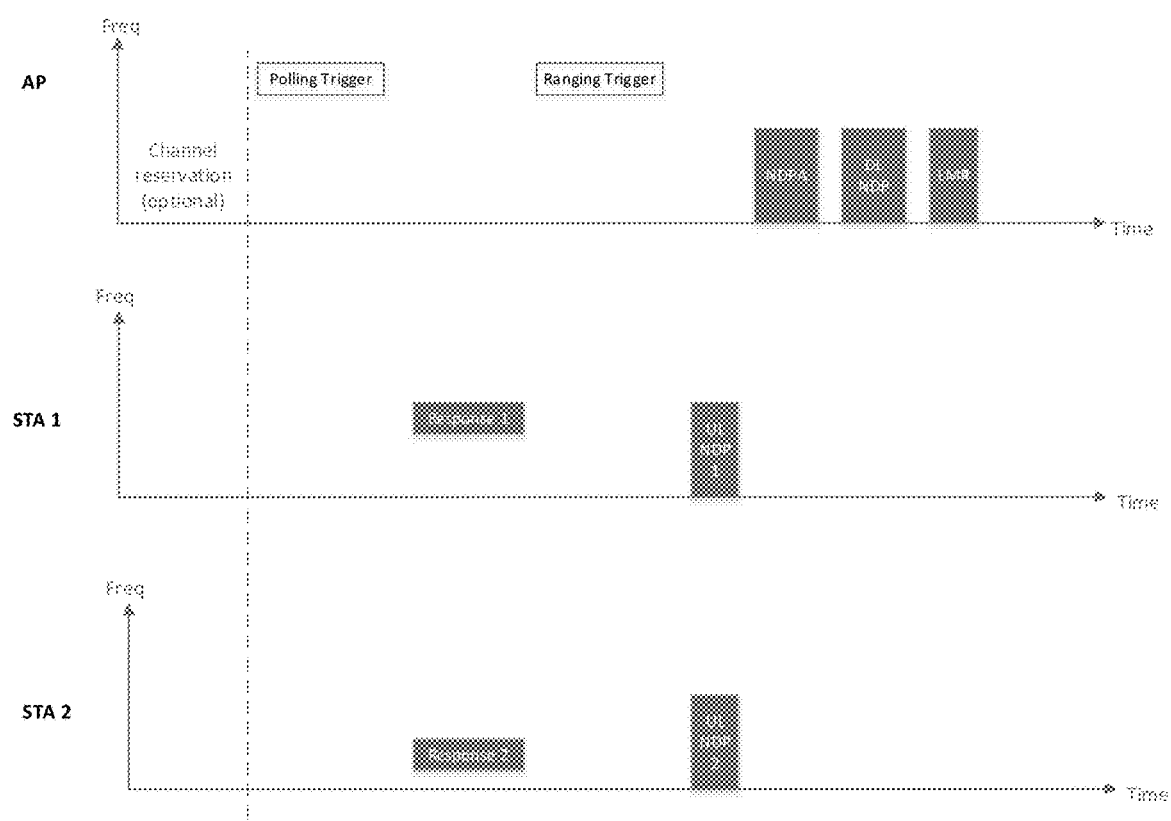
FIG. 15 illustrates example elements that may be exchanged in accordance with some embodiments.

In 1500 in FIG. 15, a multiuser ranging exchange sequence with sounding bandwidth extension is illustrated. In the existing 802.11az multiuser ranging scheme, a poll for the users' availability is conducted at the beginning. In addition, two trigger frames are used, one for polling the users' availabilities and the other for soliciting UL NDPs. We reuse the 11az scheme but send the control frames and sounding frames on different channels. In FIG. 15, the AP may first reserve the 80 MHz channel for the upcoming soundings. For example, a self-CTS frame may be sent by the AP for the channel reservation. Only the sounding frame i.e. UL NDP or DL NDP needs to be sent over the 80 MHz channel for a larger bandwidth. The other frames such as trigger frames, poll response, NDPA, and LMR can be sent on 10 MHz or 80 MHz channel with pros and cons. We depict some options below.

After the channel reservation of the 80 and/or 10 MHz channel, which may be optional, the AP may poll the availability of the users by sending a polling trigger frame. The polling trigger tells the users which resource unit and which channel they should send the polling response. Since the users usually monitor the 10 MHz channel, the polling trigger should be sent over the 10 MHz channel. The polling response may be sent in an OFDMA fashion like in 11az, where the polling response may be a QoS null frame for overhead reduction. Although the polling response can be sent on the 10 MHz channel for backward compatibility, for reserving the sounding channel and reducing the transmission time, the polling response may be sent on the 80 MHz channel instead of the 10 MHz channel. Before sending the polling response, the user may do CCA. For doing CCA and channel switching, the duration between the polling trigger and the polling response may be equal to or longer than a SIFS.

After receiving the polling response, the AP may solicit the uplink soundings by sending a ranging trigger frame to the scheduled users as illustrated in FIG. 15. The ranging trigger frame may be sent on the 10 MHz channel or the 80 MHz channel. The advantage for sending the trigger in 10 MHz is that the user can go back to the 10 MHz sooner if the user is not scheduled for the ranging. Since it is assumed that the each user having sent a response should be scheduled for the subsequent ranging in 11az, it is unlikely that a user won't get scheduled for a ranging after sending the response. Therefore, the ranging trigger may be sent on the 80 MHz channel for reducing transmission time. After receiving the ranging trigger, the user e.g. STA 1 may send UL NDP to the AP on the 80 MHz channel. There may be multiple ranging triggers for soliciting multiple groups of users. It should be noticed that one trigger frame may only trigger one user. After the UL NDP sounding(s), the AP sends NDPA, DL NDP, and LMR on the 80 MHz channel. Although NDPA and LMR may be sent on the 10 MHz channel, it uses less channel time to send them on the 80 MHz channel. If a delayed feedback is used, the LMR for the current ranging measurement is not sent immediately after the DL NDP. In this case, the LMR may be sent on the 80 MHz channel after a future DL NDP. Or, the LMR may be sent on the 10 MHz channel. In any case, the AP should let the user know which channel the LMR will be sent so that the user knows when the user should switch the listening channel back to the 10 MHz channel. In FIG. 15, an example 1500 of multiuser ranging with extended sounding bandwidth is shown.

Figure 16:
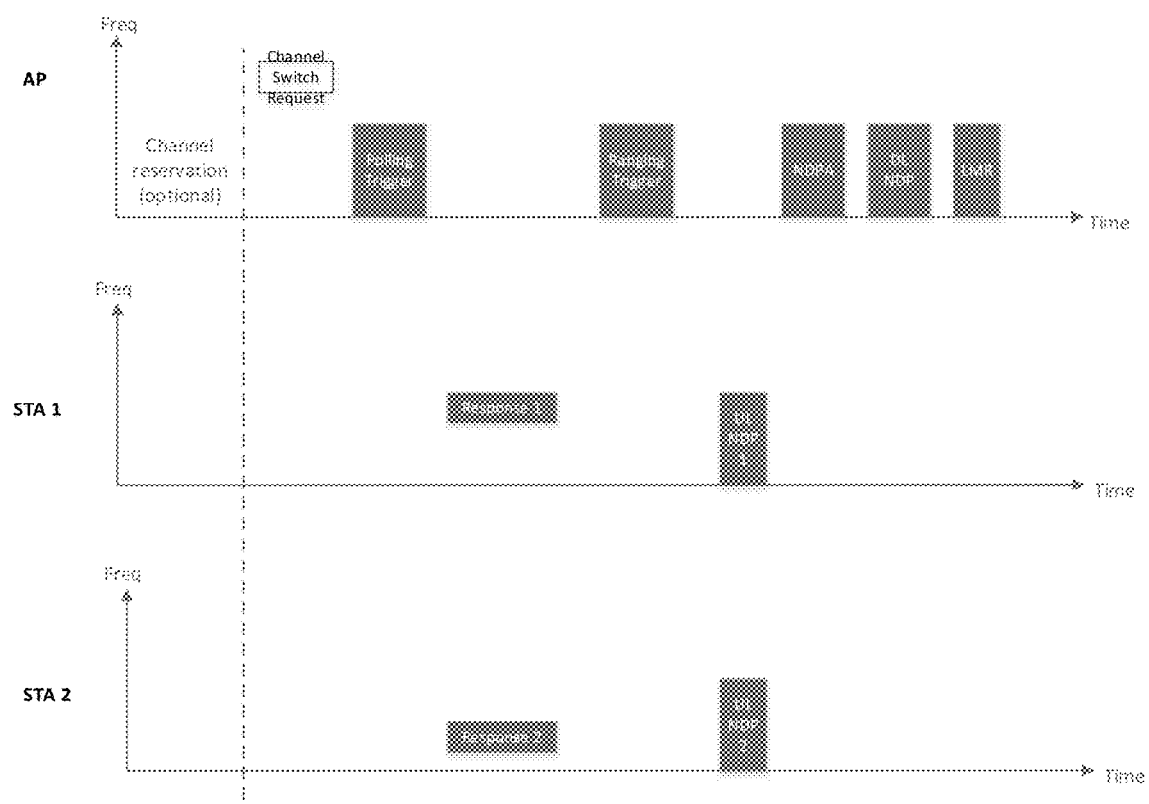
FIG. 16 illustrates example elements that may be exchanged in accordance with some embodiments.

In FIG. 16, an example 1600 is illustrated. The backward compatibility is maximized in FIG. 16, where the 11az ranging protocol is fully reused. Channel reservation may be done on the 80 and/or 10 MHz channel(s) first. The AP then sends a channel switch request/announcement for temporarily switching the operating channel to the 80 MHz channel. The channel switch request/announcement may indicate which users should switch their channels such that unaddressed users may remain on the 10 MHz channel. Depending on the AP's choice, the indicated user may or may not send a response to the AP for the channel switch request/announcement. After the channel switch request/announcement, the AP and the indicated users may conduct 11az multiuser ranging protocol on the 80 MHz channel. For a delayed feedback of LMR, the LMR may be sent on an extended channel e.g. the same or another 80 MHz channel in the next round of measurement or on the 10 MHz channel. For the immediate feedback of LMR, the LMR may be sent on the 80 MHz channel. In FIG. 16, an example 1600 of multiuser ranging with extended sounding bandwidth is shown.

Figure 17:
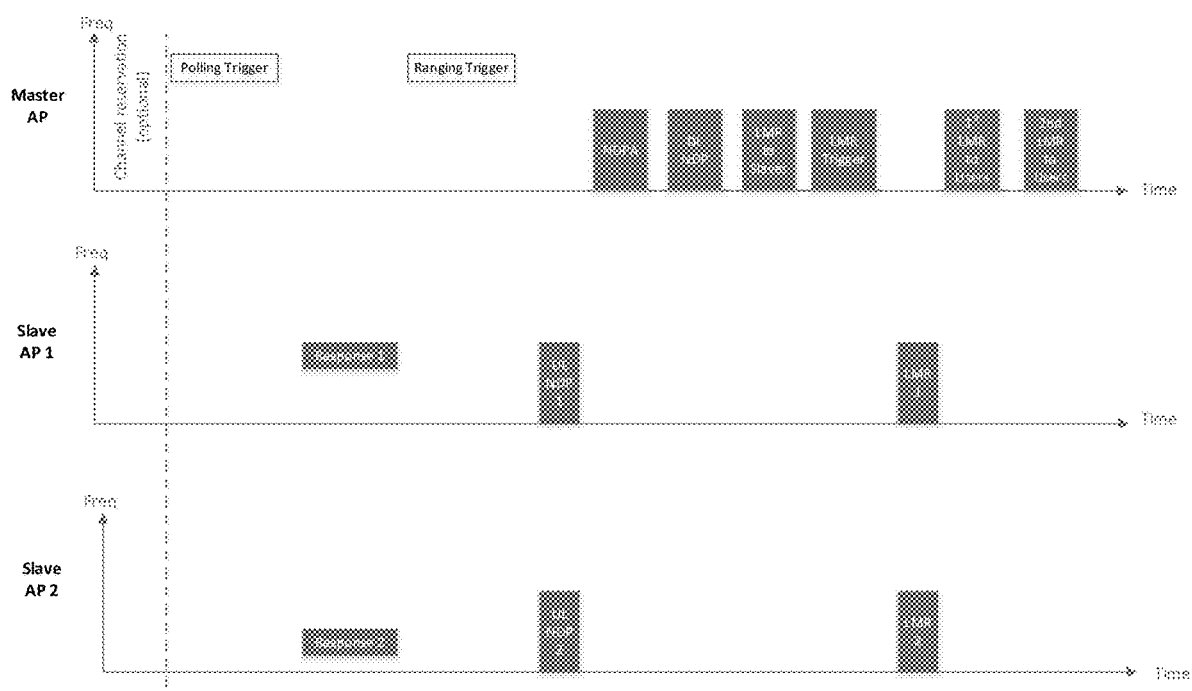
FIG. 17 illustrates example elements that may be exchanged in accordance with some embodiments.

Passive positioning developed in 11az can be applied to NGV or 11bd as illustrated in 1700 in FIG. 17. Unlike the original one in 11az, two channels are used, i.e. 10 MHz vehicle channel and 80 MHz data channel. The users usually monitor the 10 MHz channel. The APs may do ranging among them on the 80 MHz channel for a higher accuracy. The users need to receive the sounding signals sent by the APs and estimate the arrival times for the sounding signals. In addition, the users need to receive the LMR from the master AP for knowing the transmission times of the sounding signals.

Figure 18:
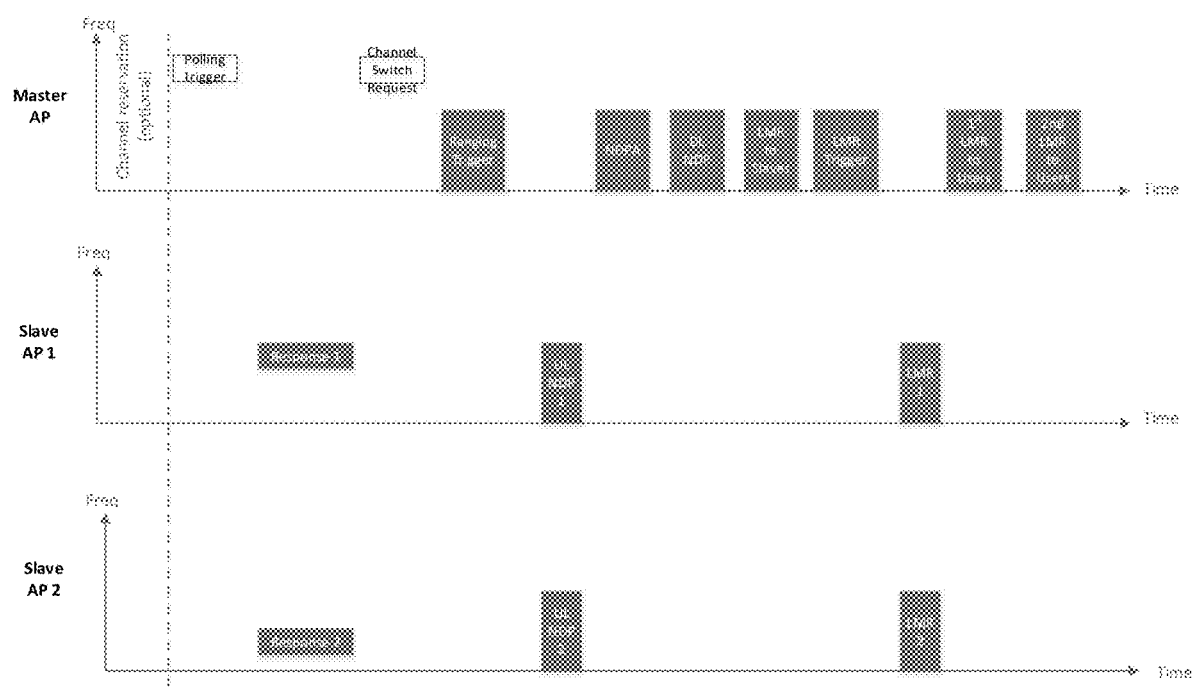
FIG. 18 illustrates example elements that may be exchanged in accordance with some embodiments.

An efficient scheme is illustrated in FIG. 17. The master AP may reserve the 10 and/or 80 MHz channel(s) first. After that, the master AP may poll the slave APs for their availability using a polling trigger frame. The polling trigger may be sent on the 10 MHz channel if the slave APs usually monitor the 10 MHz channel. In the polling trigger frame, the master AP may indicate which channel will be used for the sounding channel e.g. the 10 MHz or the 80 MHz channel. The slave AP may send the polling response on the 10 MHz channel and/or the 80 MHz channel. Sending the polling response on the 80 MHz channel helps the slave AP to acquire and hold the 80 MHz channel. Following the poll and response, the master AP sends a ranging trigger frame on the 10 MHz channel such that the users monitoring the 10 MHz channel can receive the trigger. The trigger frame tells the slave APs and the users which channel is used for the subsequent soundings. Following the ranging trigger frame, the slave APs send UL NDPs and the AP sends NDPA and DL NDP on the 80 MHz channel. After the bidirectional soundings, LMRs are sent. In FIGS. 17 and 18, the AP sends "LMR to Slaves" to the slave APs. The slave APs send "LMR 1" and "LMR 2" to the AP. The users don't need to receive these LMRs since these LMRs are for the APs. The last two LMRs i.e. "$1^{st}$ LMR to Users" and "$2^{nd}$ LMR to Users" are for the users. These two LMRs can be sent on the 80 MHz channel for a higher throughput. Or, they may be sent on the 10 MHz channel so that the users can switch back to the 10 MHz earlier i.e. after receiving the DL NDP. In FIG. 17, an example 1700 of passive positioning with extended sounding bandwidth is shown.

For the reuse of 11az, the passive positioning exchange sequence including the ranging trigger may be sent on the 80 MHz channel as illustrated in FIG. 18. For putting the users on the 80 MHz channel, a channel switch request/announcement may be sent on the 10 MHz channel before the ranging trigger. The indication of channel switch may be sent earlier so that the users have more time for the channel switching. For example, the channel switch request/announcement may be sent before or after the polling trigger. For another example, the channel switch request/announcement for the users may be combined with the polling trigger for the slave APs. Namely, the polling trigger tells the both the users and the slave APs to switch to the 80 MHz channel for the subsequent operations. If the users don't receive the ranging trigger within a certain time, the users may switch back to the 10 MHz channel. In FIG. 18, an example 1800 of multiuser ranging mode with channel switch request is shown. White box and blue boxes are for 10 MHz channel and 80 MHz channel, respectively.

Figure 19:
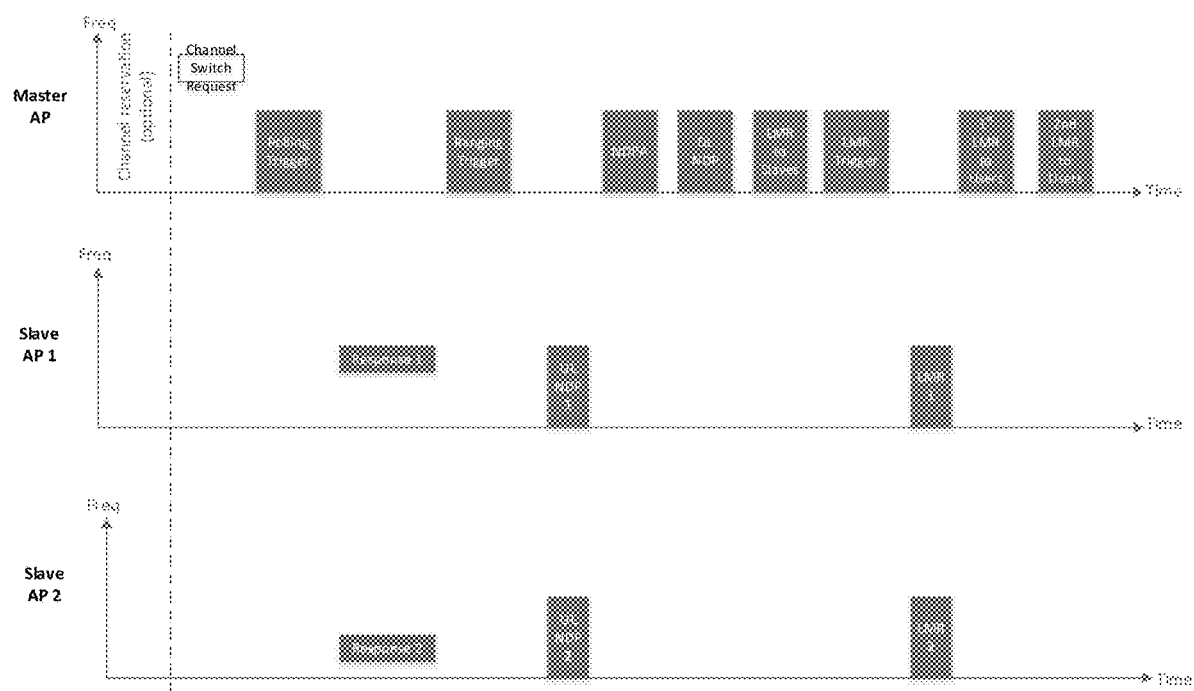
FIG. 19 illustrates example elements that may be exchanged in accordance with some embodiments.

FIG. 19 illustrates another scheme that maximizes the reuse of 11az. All frames used by 11az including the polling trigger are sent on the 80 MHz channel. After an optional channel reservation of the 80 and/or 10 MHz channel(s), a channel switch request/announcement tells both the AP and the users to switch to the 80 MHz channel for passive positioning. The rest of the scheme are the same as 11az. In some embodiment, the slave AP may send a response for the channel switch request/announcement on the 10 MHz or 80 MHz channel. In this case, the channel switch request/announcement may allocate transmission resources for the slave APs to send the responses in a way similar to a trigger frame for uplink multiuser data transmissions. In FIG. 19, an example 1900 of multiuser ranging mode with channel switch request is shown. White box and blue boxes are for 10 MHz channel and 80 MHz channel, respectively.

The channel switching takes different amounts of time for different implementations. For example, if multiple carrier frequency clocks are maintained, the switching can be fast. Otherwise, the switching may take longer than SIFS time e.g. for the PLL to settle. Unlike the multiband operation in WFA, the users are usually in the unassociated mode for NGV or 11bd since two cars may meet and separate within a short duration. 2-way handshaking procedures should be minimized. Namely, the user may not have the chance to tell the AP how long the channel switching takes. Therefore, the AP may announce the maximum tolerable channel switching time e.g. in the AP's beacon. If it meets the user's capability, the user may join the ranging or passive positioning. In the schemes described above, we assume the switching is fast for most of the cases. Namely, after the channel switch request/announcement is sent, the user or AP should be ready in the 80 MHz channel within SIFS or a duration on the order of SIFS. If the switching time is longer than that, a response frame may be needed. Some examples are listed next. For example, an ACK frame may be sent to acknowledge the reception of the channel switch request/announcement. For another example, after receiving the channel switch request/announcement, a response frame may be sent when the sender is ready to switch to the 80 MHz channel or when the sender is ready to receive on the 80 MHz channel. For a third example, the responder of the channel switch request/announcement may first send an ACK on the 10 MHz channel and latter send a response frame on the 80 MHz channel so that the other side knows the responder is ready on the 80 MHz channel. A TXOP duration or a duration staying on another channel should be specified in the channel switch request/announcement frame or NDPA frame or trigger frame so that the users know how long they should stay on the 80 MHz channel.

Some embodiments may be related to transition to a tight 20 MHz mask in NGV systems. The DSRC band of 5.9 GHz (5.85-5.925 GHz) is reserved for vehicular communications, that is, V2X (V2I/V2N/V2V/V2P) communications. The 802.11p standard is defined as the air interface and Wireless Access in Vehicular Environments (WAVE) protocols have been specified on top of 802.11p to enable different vehicular services. In order to enhance these V2X services, as well as to be competitive with cellular based V2X solutions, IEEE 802.11 started a group to improve 802.11p air interface to provide higher throughput (using e.g., MIMO, higher MCSs, and higher bandwidth), better reliability (using e.g., LDPC) and longer range and robustness to high mobility (using e.g., extended range (DCM), STBC, midambles, traveling pilots), among other potential enhancements. This group has named the Wi-Fi evolution as Next Generation V2x (NGV) and is now formed a group named 802.11bd.

The target for the group is to create a new air interface while also being compatible with 802.11p devices and maintaining the same level of performance for 11p devices. Basically, the need is for 802.11p devices to not experience any degradation in performance due to introduction of NGV devices compared to additional 11p devices.

The community has converged on maximizing reuse of other Wi-Fi standards to be used in this band. The target is use of 802.11ac or 802.11ax to be down clocked to operating in the new minimum bandwidth of 10 MHz. One of the goals of NGV is to define 20 MHz transmissions to achieve higher throughput. While the DSRC band channelization includes 2 20 MHz channels, 11p only defined 10 MHz operation. The challenge however is to introduce 20 MHz operation in a way there is no impact on 10 MHz operation in the adjacent channels.

To ensure there is no negative impact on the performance of the 10 MHz adjacent channels, the transmit power leakage out of the 20 MHz channel should be kept the same or lower than the leakage in case of 10 MHz operation only. The transmit power leakage is limited by defining transmit spectrum masks that all devices are required to meet. Hence by using a "tight" 20 MHz transmit mask equivalent to the currently defined 11p mask, there will be no performance degradation to 11p devices caused by NGV 20 MHz transmissions.

There are different factors that impact the ability of a device to meet the mask requirements, including the transmit power and design of the power amplifier (PA). Meeting the "tight" 20 MHz mask requirements at the higher transmit power levels, required for vehicular applications, known as Class C devices, is quite challenging. Class C devices require external PAs and to the best of our knowledge there are no ePA's available, off-the-shelf, that can meet the "tight" 20 MHz mask at all temperatures based on the regulations for vehicular applications.

Due to this challenge, TGbd is considering defining a "relaxed" mask which current commercial ePA's could meet. The downside however, is that the leakage on the adjacent channels due to 20 MHz transmissions could be increased, compared to 11p only operation, and hence negatively impact the 10 Mhz transmissions in the adjacent 10 MHz channels.

Some embodiments may be related to one or more of the following elements. 1) Defining two (or possibly even more) masks, one "relaxed" mask which can be met with currently available commercial ePAs, and one "tight" mask which guarantees the same ACI in adjacent 10 MHz channels as 11p (and can be satisfied when better masks are on the market). Furthermore, additional, more stringent masks could be defined, or left to be defined in the future through signaling. This would allow for classes of devices to evolve as the technology of ePAs advance. 2) Defining a migration path from the "relaxed" mask to the "tight" mask as more and more devices capable of meeting the "tight" mask become available in the field such that the overall network performance improves. Additionally, if more than two masks are defined, there could be multiple steps in the evolution path without the need to define a new standard. 3). Enabling the flexibility of the NGV devices to maximize system performance by using the transmit mask information to configure connections and channel assignments based on the devices in an area. For example, if there are devices that want to use 20 MHz operation, and they are aware that all surrounding devices are capable of the "tight" mask, they could utilize all adjacent channels more efficiently. Conversely, if there are devices within an area, that are only capable of the relaxed mask, then potentially moving them to channels where they won't interfere with other 10 MHz transmissions. 4). Additionally, the use of the MASK type that a device has can also be used to consider special modes or operational protocol, such as a case where a device with a "relaxed" mask may not be able to use a 20 MHz transmission in a specific time/region. 5) Finally, the use of the mask type could be used to penalize devices with a poor mask over ones with better masks. Encouraging the use of devices that can support a tight transmit mask.

The channelization of 5.9 GHz band in the US is shown in FIG. 20. FIG. 20 illustrates a DSRC frequency allocation in the US.

TGbd is defining operation in channels 175 and 181, which was not previously defined in 11p. A design goal and requirement is to ensure the ACI due to transmissions in channels 175 and 181 does not increase the ACI in channels 172, 178, and 184 compared to 10 MHz only channelization. To achieve this the new spectrum mask to be defined for channels 175 and 181, may be referred to as a "tight" mask, and may be based on one or more tables (including but not limited to the table below, one or more other tables disclosed herein, one or more tables included in a standard).

| STA transmit power class | Permitted power spectral density, dBr | | | | |
| --- | --- | --- | --- | --- | --- |
| | ±95 MHz offset (±f1) | ±10 MHz offset (±f2) | ±10.5 MHz offset (±f3) | ±15 MHz offset (±f4) | ±20 MHz offset (±f5) |
| Class A | 0 | −10 | −20 | −28 | −40 |
| Class B | 0 | −16 | −20 | −28 | −40 |
| Class C | 0 | −26 | −32 | −40 | −50 |
| Class D | 0 | −35 | −45 | −55 | −65 |

However, as described above meeting the Class C mask using the existing ePA available on the market is impossible. Hence, TGbd is considering definition of a mask that can be met by currently available commercial ePAs, referred to here as the "relaxed" mask. The "relaxed" mask has a value 6 to 8 dB higher at +/−20 MHz offset compared to the "tight" mask.

Currently NGV is debating to choose one of these two masks, either "tight" or "relaxed" mask. This proposal is to define both masks and define a mechanism for signaling whether an NGV device is capable of meeting the "tight" mask. This information is then used by the scheduling function of NGV devices to assess the ACI on channels 172, 178, and 184, and make informed decisions on whether to initiate transmissions on those channels or not.

Additionally, embodiments described herein are not limited to just two masks. It could be advantageous to have multiple mask definitions to afford an evolutionary path based on ePA technology advancements that could be utilized immediately by the NGV system without a standards revisions.

The signaling of what mask the NGV device is capable of can be done in different forms: 1) PHY level signaling: there will be a bit, Mask Capability bit, defined in NGV-SIG field in preamble indicating whether the device is meeting "tight" or "relaxed" mask; and maybe more than one bit to signal varying levels of mask, 2) MAC level signaling: there may be a bit included in MAC Header indicating this information, 3) Application level signaling: the capabilities indication as part of the payload of the message is used for signaling, and/or 4) other.

In either of the cases, for the definition of more than one mask, the signaling could include additional signaling to define the mask. Likely this additional signaling would be done in the MAC or application layer. Note that the signaling could be a single bit to inform either the relaxed or tight mask, or could be signaling of the mask at fixed frequency offsets from a center frequency. This would allow for multiple masks to be defined either now in the standard, or at any time during the operation of the system. Additionally, the mask type can also be used to determine operational procedures. Such as disallowing devices to operate under certain bandwidths, or on certain channels. An example is where a device with a relaxed transmit mask would be disallowed from operating using 20 MHz, or from operating at 20 MHz but on a channel adjacent to a channel that is a safety channel where interference cannot be tolerated.

Additionally, as mentioned above, the use of the mask type could be used to penalize devices with a poor mask over ones with better masks. Encouraging the use of devices that can support a tight transmit mask. Effectively, a relaxed transmission may occupied 4 10 MHz bands instead of 2 10 MHz bands. Some solutions may be as follows. For one example, one may increase the contention window size of the relaxed mask transmitter such that it gives the priority to the tight mask transmitter. For another example, one may ask the relaxed mask transmitter to check whether the adjacent 10 MHz channels are idle before the relaxed 20 MHz transmission. There should be other ways to award the tight mask transmitter.

Among the three approaches, the PHY signaling has the following advantages: a) the information is readily available to the receiver device, regardless of where and at which layer the ACI-based scheduling is performed, b) the ACI-based scheduling is very time sensitive and is best performed at PHY/lower MAC. If the capability information is passed at MAC or higher layers then lower layer decision making would not be possible.

The mask capability information is used as following: Every NGV device (whether transmitting in 10 MHz or 20 MHz) will indicate whether it is able to meet the "tight" mask or not by setting the corresponding bit in NGV-SIG in case of PHY signaling (equivalent feature in MAC or application layer signaling applies).

In some embodiments (referred to as "Approach 1" for clarity), NGV capable devices receiving the NGV transmissions, both 10 and 20 MHz, regardless of the transmission channel, use that information as an input to assess the aggregate capability of devices nearby while making decision regarding transmissions in the 3 10 MHz channels adjacent to 20 MHz channels. In this approach an overall picture of capability of nearby devices is used to make a decision on the 10 MHz channels.

In some embodiments (referred to as "Approach 2" for clarity), the transmission decision in channels 172, 178, and 184 is dependent only on the capability indication received from devices transmitting on 20 MHz channels 175 and 181. In this approach the decision making is based on the capability of the NGV devices actively transmitting in 20 MHz channels.

In both cases, the scheduling decision can either be instantaneous, i.e., making a decision on time of the transmission on a per-packet basis (performed at PHY/lower MAC), or can be an aggregate approach taken by higher layers, i.e. the frequency of message transmissions, reparation of a message, etc., can be adjusted (by the higher layers) depending on the expected ACI level. There may also be a combination of these two approaches implemented.

In some embodiments, an advantage is that as ePA technology improves and more and more NGV devices capable of meeting the "tight" mask (or one of the stepped masks if more than two masks are defined), become available, the overall network performance can improve due to higher spectral efficiency and simultaneous use of adjacent 20 and 10 MHz channels.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA), the STA configurable to operate as a responding STA in a null data packet (NDP) based ranging procedure with an initiating STA, wherein the apparatus comprises: memory; and processing circuitry,
wherein when the STA operates as the responding STA, as part of the NDP based ranging procedure, the processing circuitry is configured to:
encode, for transmission, a broadcast frame that indicates one or more ranging parameters, the ranging parameters comprising at least one of a bandwidth and frequency band;
detect the first NDP from the initiating STA;
encode a second NDP for transmission to the initiating STA; and
encode, for transmission to the initiating STA, a first location measurement report (LMR) that indicates: a reception time of the first NDP at the responding STA, and a transmission time of the second NDP at the responding STA,
wherein the first and second NDP comprise a legacy preamble followed by an Next Generation Vehicle-to-Everything (NGV) preamble, the legacy preamble comprising a legacy short training field (L-STF) and a legacy long training field (L-LTF) followed by a legacy signal field (L-SIG), the NGV preamble comprising an NGV signal field (NGV-SIG) followed by an NGV-STF and an NGV-LTF,
wherein when the first NDP is detected without a prior announcement by an NDP announcement (NDPA) frame, the NGV-SIG of the first NDP includes an indicator to indicate that the first NDP is for ranging, and wherein in response to the indicator, the processing circuitry is configured to buffer channel estimates determined from the NGV-LTF for subsequent use in the NDP based ranging procedure.

2. The apparatus according to claim 1, wherein when the STA operates as the responding STA, the processing circuitry is further configured to:

decode, from the initiating STA, a second LMR that indicates: a transmission time of the first NDP at the initiating STA, and a reception time of the second NDP at the initiating STA; and determine a range between the initiating STA and the responding STA, the range determined based at least partly on one or more of: the reception time of the first NDP at the responding STA, the transmission time of the second NDP at the responding STA, the transmission time of the first NDP at the initiating STA, and the reception time of the second NDP at the initiating STA.

3. The apparatus according to claim 1, wherein the ranging parameters include one or more of:
a number of antennas of the responding STA,
a number of spatial time streams supported for transmission by the responding STA,
a number of spatial time streams supported for reception by the responding STA, and
a number of antennas supported for reception by the responding STA.

4. The apparatus according to claim 1, wherein the ranging parameters include one or more of:
a number of repetitions supported by the responding STA,
a feedback type for LMRs, wherein the feedback type is immediate or delayed,
a maximum time interval between two consecutive ranging measurement sequences at the responding STA, and
a minimum time interval between two consecutive ranging measurement sequences at the responding STA.

5. The apparatus according to claim 1, wherein the ranging parameters include one or more of:
a bandwidth used for ranging measurements at the responding STA, and
a frequency band for ranging measurements at the responding STA.

6. The apparatus according to claim 1, wherein the processing circuitry is further configured to:
encode signaling for transmission to the initiating STA, wherein the signaling indicates a request to receive a ranging measurement report from the initiating STA.

7. The apparatus according to claim 1, wherein the processing circuitry is further configured to perform the NDP based ranging procedure without negotiation between the responding STA and the originating STA.

8. The apparatus according to claim 1, wherein the processing circuitry is further configured to encode the broadcast frame to include a medium access control (MAC) address of the responding STA.

9. The apparatus according to claim 1, wherein the responding STA is arranged to operate in accordance with a Next Generation Vehicular (NGV) protocol.

10. The apparatus according to claim 1, wherein:
the processing circuitry includes a baseband processor to encode the broadcast frame,
the apparatus further comprises a transceiver to transmit the broadcast frame, and
the memory is configured to store at least a portion of the broadcast frame.

* * * * *